United States Patent
Campau et al.

(10) Patent No.: US 12,175,165 B2
(45) Date of Patent: *Dec. 24, 2024

(54) METHODS FOR DESIGNING, MANUFACTURING, INSTALLING, AND/OR MAINTENANCE OF ROOFING ACCESSORIES AND SYSTEMS OF USE THEREOF

(71) Applicant: BMIC LLC, Dallas, TX (US)

(72) Inventors: Zachary Richard Campau, Novato, CA (US); Rich Robinson, Round Rock, TX (US)

(73) Assignee: BMIC LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,742

(22) Filed: Dec. 13, 2023

(65) Prior Publication Data

US 2024/0111917 A1    Apr. 4, 2024

Related U.S. Application Data

(63) Continuation of application No. 18/193,210, filed on Mar. 30, 2023, now Pat. No. 11,928,394, which is a
(Continued)

(51) Int. Cl.
*G06F 30/13* (2020.01)
*E04D 1/20* (2006.01)
(Continued)

(52) U.S. Cl.
CPC ............... *G06F 30/13* (2020.01); *E04D 1/20* (2013.01); *F24S 20/67* (2018.05); *G01S 17/89* (2013.01);
(Continued)

(58) Field of Classification Search
CPC .......... G06F 30/13; G06F 30/20; G06F 30/17; G06F 2119/06; G06Q 10/0875;
(Continued)

(56) References Cited

U.S. PATENT DOCUMENTS 9,070,018 B1    6/2015    Ciarcia et al.
10,133,829 B2   11/2018   Chen et al.
(Continued)

*Primary Examiner* — Andre Pierre Louis
(74) *Attorney, Agent, or Firm* — GREENBERG TRAURIG, LLP

(57) ABSTRACT

Systems and methods of the present disclosure enable automated roof planning using a processor. The processor receives a digital image of a roof of a structure and models each roof plane of the roof to generate a roof model. The processor determines dimensions of each roof plane based on the roof model. The processor retrieves roofing accessory data from a database, the roofing accessory data solar roofing accessory part identifiers and solar roofing accessory part performance characteristics for solar roofing accessories. The processor simulates multiple candidate roof layouts based on the dimensions of each roof plan and the solar roofing accessory parts and determines a utilization prediction for each candidate layout. Based on each utilization prediction, the processor determines a particular roof layout having selected solar roofing accessory parts, and generates a solar roof design, including a list of materials, for the particular roof layout.

20 Claims, 10 Drawing Sheets

Related U.S. Application Data continuation of application No. 18/056,957, filed on Nov. 18, 2022, now Pat. No. 11,625,511.

(60) Provisional application No. 63/281,391, filed on Nov. 19, 2021.

(51) Int. Cl.
| | | |
|---|---|---|
| *F24S 20/67* | (2018.01) | |
| *G01S 17/89* | (2020.01) | |
| *G06F 30/17* | (2020.01) | |
| *G06F 30/20* | (2020.01) | |
| *G06Q 10/0875* | (2023.01) | |
| *G06Q 30/0283* | (2023.01) | |
| *G06Q 50/08* | (2012.01) | |
| *G06F 119/06* | (2020.01) | |

(52) U.S. Cl.
CPC .............. *G06F 30/17* (2020.01); *G06F 30/20* (2020.01); *G06Q 10/0875* (2013.01); *G06Q 30/0283* (2013.01); *G06Q 50/08* (2013.01); *G06F 2119/06* (2020.01)

(58) Field of Classification Search
CPC .... G06Q 30/0283; G06Q 50/08; G01S 17/89; F24S 20/67; E04D 1/20
USPC ................................................................ 703/1
See application file for complete search history.

(56) References Cited

U.S. PATENT DOCUMENTS

| | | |
|---|---|---|
| 10,930,063 B2 | 2/2021 | Pershing et al. |
| 11,030,358 B2 | 6/2021 | Pershing |
| 11,416,644 B2 | 8/2022 | Keane |
| 11,423,614 B2 | 8/2022 | Pershing et al. |
| 11,468,104 B2 | 10/2022 | Barrow et al. |
| 11,526,952 B2 | 12/2022 | Pershing |
| 11,551,413 B2 | 1/2023 | Sehgal et al. |
| 11,587,176 B2 | 2/2023 | Ekman |
| 2008/0021683 A1 | 1/2008 | Rahmes et al. |
| 2013/0246010 A1 | 9/2013 | Dershowitz et al. |
| 2016/0292312 A1* | 10/2016 | Saha .................... G06Q 50/06 |
| 2018/0292312 A1 | 10/2018 | Akiyama et al. |
| 2020/0293773 A1 | 9/2020 | Loveland et al. |
| 2022/0139024 A1* | 5/2022 | Loveland ................ G06T 17/05 345/426 |

* cited by examiner

METHODS FOR DESIGNING, MANUFACTURING, INSTALLING, AND/OR MAINTENANCE OF ROOFING ACCESSORIES AND SYSTEMS OF USE THEREOF

CROSS REFERENCE TO RELATED APPLICATIONS

The present application is a continuation of U.S. patent application Ser. No. 18/193,210, filed Mar. 30, 2023, which is a continuation of U.S. patent application Ser. No. 18/056,957 filed Nov. 18, 2022, now U.S. Pat. No. 11,625,511, which claims priority to U.S. Provisional Application No. 63/281,391, filed on Nov. 19, 2021, which are hereby incorporated by reference in their entirety.

FIELD OF TECHNOLOGY

The present disclosure generally relates to methods for designing, manufacturing, installing, and/or maintenance of roofing accessories and systems of use thereof.

BACKGROUND OF TECHNOLOGY

Solar-based power generation has become an important tool for energy generation and grid resiliency. Solar generation devices may be designed, manufactured, installed and/or maintained by various methods.

SUMMARY OF DESCRIBED SUBJECT MATTER

In some embodiments, the present disclosure provides an exemplary technically improved method that includes at least the following steps of: receiving, by a processor, at least one digital image of a roof of a structure; modelling, by the processor, at least one roof plane of the roof in the at least one digital image to generate a roof plane model; determining, by the processor, a plurality of dimensions of the at least one roof plane based at least in part on the roof plane model; retrieving, by the processor, roofing accessory data in a roofing accessory database, where the roofing accessory data includes: a plurality of solar roofing accessory part identifiers, where each solar roofing accessory part identifier identifies each solar roofing accessory part of the plurality of solar roofing accessory parts and a plurality of solar roofing accessory part performance characteristics, where each solar roofing accessory part performance characteristic associated with each solar roofing accessory part of the plurality of solar roofing accessory parts; simulating, by the processor, a plurality of candidate roof layouts for the at least one roof plane based at least in part on: the plurality of dimensions of the at least one roof plane and the plurality of solar roofing accessory parts, where each candidate roof layout of the plurality candidate roof layouts includes a plurality of roof segments, where the plurality of roof segments includes: a plurality of first type roof segments having a plurality of solar roofing accessory parts and a plurality of second type roof segments having a plurality of non-solar roofing accessory parts; analyzing, by the processor, the plurality of candidate roof layouts based at least in part on the plurality of first type roof segments having the plurality of solar roofing accessory parts and the plurality of second type roof segments having the plurality of non-solar roofing accessory parts to assign a particular utilization prediction to each candidate roof layout of the plurality of candidate roof layouts to generate a plurality of utilization predictions, where the particular utilization prediction of each candidate roof layout is based at least in part on: at least one installation metric for installing each candidate roof layout and at least one solar roofing accessory part performance characteristic associated with each solar roofing accessory part; determining, by the processor, a particular roof layout from the plurality of candidate roof layouts based at least in part on the plurality of utilization predictions associated with the plurality of candidate roof layouts, where the particular roof layout includes: a plurality of selected solar roofing accessory parts associated with the plurality of solar roofing parts of the particular roof layout and a plurality of selected non-solar roofing accessory parts of the plurality of non-solar roofing accessory parts; generating, by the processor, a solar roof design based at least in part on the particular roof layout, where the solar roof design includes a list of solar roofing accessory part identifiers, identifying each selected solar roofing accessory part of the plurality of selected solar roofing accessory parts of the particular roof layout so as to track each selected solar roofing accessory part during a lifetime of a roof completed based at least in part on the solar roof design; and instructing, by the processor, at least one computing device to display the solar roof design.

In some embodiments, the present disclosure provides an exemplary technically improved system that includes at least the following accessories of: at least one processor configured to execute software instructions. The software instructions, when executed, cause that least one processor to perform steps to: receiving, by a processor, at least one digital image of a roof of a structure; model at least one roof plane of the roof in the at least one digital image to generate a roof plane model; determine a plurality of dimensions of the at least one roof plane based at least in part on the roof plane model; retrieve roofing accessory data in a roofing accessory database, where the roofing accessory data includes: a plurality of solar roofing accessory part identifiers, where each solar roofing accessory part identifier identifies each solar roofing accessory part of the plurality of solar roofing accessory parts and a plurality of solar roofing accessory part performance characteristics, where each solar roofing accessory part performance characteristic associated with each solar roofing accessory part of the plurality of solar roofing accessory parts; simulate a plurality of candidate roof layouts for the at least one roof plane based at least in part on: the plurality of dimensions of the at least one roof plane and the plurality of solar roofing accessory parts, where each candidate roof layout of the plurality candidate roof layouts includes a plurality of roof segments, where the plurality of roof segments includes: a plurality of first type roof segments having a plurality of solar roofing accessory parts and a plurality of second type roof segments having a plurality of non-solar roofing accessory parts; analyze the plurality of candidate roof layouts based at least in part on the plurality of first type roof segments having the plurality of solar roofing accessory parts and the plurality of second type roof segments having the plurality of non-solar roofing accessory parts to assign a particular utilization prediction to each candidate roof layout of the plurality of candidate roof layouts to generate a plurality of utilization predictions, where the particular utilization prediction of each candidate roof layout is based at least in part on: at least one installation metric for installing each candidate roof layout and at least one solar roofing accessory part performance characteristic associated with each solar roofing accessory part; determine a particular roof layout from the plurality of candidate roof layouts based at least in part on the plurality of utilization predictions associated with the plurality of candidate roof layouts, where the particular roof layout includes: a plurality of selected solar roofing accessory parts associated with the plurality of solar roofing parts of the particular roof layout and a plurality of selected non-solar roofing accessory parts of the plurality of non-solar roofing accessory parts; generate a solar roof design based at least in part on the particular roof layout, where the solar roof design includes a list of solar roofing accessory part identifiers, identifying each selected solar roofing accessory part of the plurality of selected solar roofing accessory parts of the particular roof layout so as to track each selected solar roofing accessory part during a lifetime of a roof completed based at least in part on the solar roof design; and instruct at least one computing device to display the solar roof design.

One or more embodiments of systems and methods described herein further include: determining, by the processor, full-device placements in the at least one first type roof segment based at least in part on the plurality of solar roofing accessory parts and the dimensions of the at least one roof plane, where the full-device placements represent a first arrangement of the plurality of solar roofing accessory parts that fit within in the at least one first type roof segment; determining, by the processor, partial-device placements in the at least one second type roof segment based at least in part on the plurality of solar roofing accessory parts and the dimensions of the at least one roof plane; and where the partial-device placements represent positions on the at least one roof plane that fit a portion of the plurality of solar roofing accessory parts.

One or more embodiments of systems and methods described herein further include where the plurality of non-solar roofing accessory parts include asphalt shingles.

One or more embodiments of systems and methods described herein further include: generating, by the processor, a bill-of-materials including a list of parts, including solar roofing accessory parts, non-solar roofing accessory parts, any other parts, or a combination thereof. In certain embodiments, the bill-of-materials may be included with the solar roof design generated by the systems and methods. The systems and methods may generate estimations of a labor cost and an accessory cost associated with installing the plurality of selected solar roofing accessory parts, non-solar roofing accessory parts, or a combination thereof, according to the solar roof design. In one or more embodiments, the estimations may serve as evaluation criteria by the systems and methods to facilitate selection of a solar roof design out of a pool of candidate solar roof designs.

One or more embodiments of systems and methods described herein further include: determining, by the processor, an installation time needed to install each selected solar roofing accessory part of the plurality of selected solar roofing accessory parts according to the solar roof design; and generating, by the processor, a bill-of-materials including a list of the selected solar roofing accessory parts according to the solar roof design.

One or more embodiments of systems and methods described herein further include: determining, by the processor, a quantity of the plurality of non-solar roofing accessory parts of the solar roof design based at least in part on particular roof layout; and generating, by the processor, a bill-of-materials representing the quantity of the plurality of non-solar roofing accessory parts of the solar roof design.

One or more embodiments of systems and methods described herein further include where each solar roofing accessory part performance characteristic associated with each solar roofing accessory part of the plurality of solar roofing accessory parts includes a part-specific solar efficiency metric.

One or more embodiments of systems and methods described herein further include: receiving, by the processor, the at least one digital image including light detection and ranging (LiDAR) measurements of the roof of the structure; and generating, by the processor, a three-dimensional model of the roof based at least in part on the LiDAR measurements.

One or more embodiments of systems and methods described herein further include: determining, by the processor, a geographic location associated with the structure; determining, by the processor, a geographic orientation of the at least one roof plane based at least in part on the geographic location and the at least one digital image; and scoring, by the processor, the plurality of candidate roof layouts based at least in part on based at least in part on the geographic orientation and the plurality of selected solar roofing accessory parts.

One or more embodiments of systems and methods described herein further include: determining, by the processor, at least one obstruction over the at least one roof plane based at least in part on the at least one digital image; and analyzing, by the processor, the plurality of candidate roof layouts based at least in part on based at least in part on the at least one obstruction and the plurality of selected solar roofing accessory parts.

One or more embodiments of systems and methods described herein further include: receiving, by the at least one processor, an updated solar roofing accessory part performance characteristic associated with a particular solar roofing accessory part of the plurality of solar roofing accessory parts, where the updated solar roofing accessory part performance characteristic associated with a particular solar roofing accessory part includes at least one user input indicating a change to the solar roofing accessory part performance characteristic associated with the particular solar roofing accessory part; and updating, by the at least one processor, a record associated with the particular solar roofing accessory part to indicate the updated solar roofing accessory part performance characteristic; and where the record is stored in a roofing accessory database.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 8 illustrate systems and methods of automated structure modelling, design and part tracking. The following embodiments provide technical solutions and technical improvements that overcome technical problems, drawbacks and/or deficiencies in the technical fields involving computer aided design and manufacturing. As explained in more detail, below, technical solutions and technical improvements herein include aspects of improved per-accessory tracking and modelling for improved structure design using computer-aided and machine learning-based techniques. By improving the accuracy and precision of the design tools using per-accessory and structural data, power generation by the modelled design may be improved such that power generation is improved, structural resiliency is improved, and grid resiliency is improved. Based on such technical features, further technical benefits become available to users and operators of these systems and methods. Moreover, various practical applications of the disclosed technology are also described, which provide further practical benefits to users and operators that are also new and useful improvements in the art.

Figure 1A:
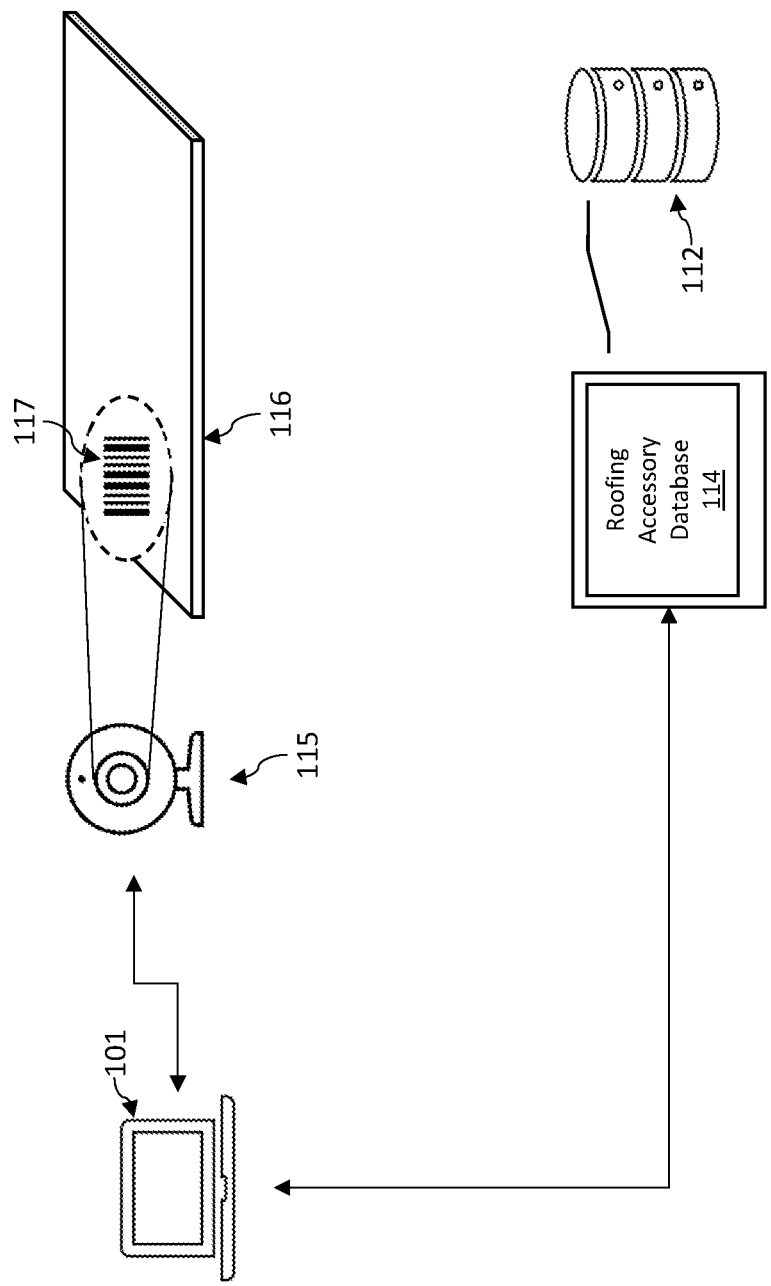
FIG. 1A is a block diagram of an exemplary computer-based system for solar roof design in accordance with one or more embodiments of the present disclosure.

FIG. 1A is a block diagram of an exemplary computer-based system for solar roof design in accordance with one or more embodiments of the present disclosure.

In some embodiments, roof and roofing system design and construction involves choosing the appropriate materials and roofing accessories for the roof. In some embodiments, variations in roofing accessories may make one roofing accessory a more optimal design than another, such as, e.g., installing shingles directly on a roofing deck or installing an underlayment on the roofing deck with the shingles installed on the underlayment. Moreover, there may be variations in performance and part characteristics of individual parts of the same roofing accessory type. Such variation may be improved or degrade the performance of a roofing system on a roof.

In some embodiments, a data storage 112 may, in a roofing accessory database 114, record performance characteristics and/or other part characteristics of individual roofing accessory parts.

In some embodiments, the roofing accessory database 114 may include one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the roofing accessory database 114 may include, e.g., a suitable non-transient computer readable medium such as, e.g., random access memory (RAM), read only memory (ROM), one or more buffers and/or caches, among other memory devices or any combination thereof.

In some embodiments, "database" refers to an organized collection of data, stored, accessed or both electronically from a computer system. The database may include a database model formed by one or more formal design and modeling techniques. The database model may include, e.g., a navigational database, a hierarchical database, a network database, a graph database, an object database, a relational database, an object-relational database, an entity-relationship database, an enhanced entity-relationship database, a document database, an entity-attribute-value database, a star schema database, or any other suitable database model and combinations thereof. For example, the database may include database technology such as, e.g., a centralized or distributed database, cloud storage platform, decentralized system, server or server system, among other storage systems. In some embodiments, the database may, additionally or alternatively, include one or more data storage devices such as, e.g., a hard drive, solid-state drive, flash drive, or other suitable storage device. In some embodiments, the database may, additionally or alternatively, include one or more temporary storage devices such as, e.g., a random-access memory, cache, buffer, or other suitable memory device, or any other data storage solution and combinations thereof.

Depending on the database model, one or more database query languages may be employed to retrieve data from the database. Examples of database query languages may include: JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages.

The database may include one or more software, one or more hardware, or a combination of one or more software and one or more hardware components forming a database management system (DBMS) that interacts with users, applications, and the database itself to capture and analyze the data. The DBMS software additionally encompasses the core facilities provided to administer the database. The combination of the database, the DBMS and the associated applications may be referred to as a "database system".

In some embodiments, the roofing accessory database 114 may be configured interact and/or to store data in one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, a distributed blockchain-type ledger implementation of the roofing accessory database 114 may be configured to utilize smart contracts, which are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated registries of the roofing accessory database 114 and contract execution using cryptographic hash chains and Byzantine fault tolerant replication. For example, each node in a peer-to-peer network or blockchain distributed network may act as a roofing accessory database 114 or a part of the roofing accessory database 114, thereby executing changes of status, performance, condition or other characteristic of each roofing accessory part according to sets of predetermined rules that govern transactions on the network. For example, each node may also check the work of other nodes and in some cases, as noted above, function as miners or validators.

In some embodiments, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The aforementioned examples are, of course, illustrative and not restrictive.

In some embodiments, the roofing accessory database 114 may include performance data and/or condition data for each roofing accessory part, where each roofing accessory part refers to an individual item, such as a particular shingle, tile, solar shingle, solar panel, active shingle (e.g., a shingle having electronic components integrated therein), ridge cap, ridge vent, roof vent, underlayment, waterproof membrane, antenna, and any other roofing accessory.

In some embodiments, the roofing accessory database 114 may index a record associated with a particular roofing accessory part 116 according to an associated roofing accessory part identifier. In some embodiments, the roofing accessory part identifier may include, e.g., a part/model number and/or name, a serial number, or other identifier identifying the particular roofing accessory part 116 or any combination thereof.

In some embodiments, the performance data may include, e.g., rated temperature range, rated load capacity, rated impact limit, rated efficiency, rated waterproofing measure, measured temperature range, measured load capacity, measured impact limit, measured efficiency, measured/tested waterproofing measure, average defect(s) quantity, measured defect(s) quantity, quality control results, among other performance data or any combination thereof. In some embodiments, the performance data may include mechanical performance, such as, e.g., rated load capacity, rated weatherproofing capacity (e.g., waterproofing and/or wind proofing, etc.), rated insulation performance, rated temperature range, rated lifetime, measured load capacity, measured weatherproofing capacity (e.g., waterproofing and/or wind proofing, etc.), measured insulation performance, measured temperature range, average defect(s) quantity, measured defect(s) quantity, time-based performance change, usage-based performance change, quality control results, or other mechanical accessory performance metric or any combination thereof.

In some embodiments, where the particular roofing accessory part 116 is an active roofing accessory, such as a solar roofing accessory, the performance data may include, e.g., rated solar efficiency, rated power efficiency, measure solar efficiency, measured power efficiency, rated peak solar power generation, measured peak solar power generation, rated average solar power generation, measured average solar power generation, rated voltage, measured voltage, rated amperage, measured amperage, time-based performance change, usage-based performance change, quality and/or performance binning, Local and Regional Permitting data sets, such as required foot setbacks or activation requirements, or other active accessory performance metric or any combination thereof. In some embodiments, the performance data may include electronic performance, such as, e.g., rated processing speed, rated throughput, rated efficiency, measured processing speed, measured throughput, measured efficiency, average defect(s) quantity, measured defect(s) quantity, time-based performance change, usage-based performance change, quality and/or performance binning, quality control results, or other electronic accessory performance metric or any combination thereof.

In some embodiments, the performance and/or mechanical data of the particular roofing accessory part 116 may be tracked through time based on updates to the performance data and/or mechanical data. In some embodiments, to reference and/or update the record associated with the particular roofing accessory part 116, a user may employ a user computing device 101 to provide the associated roofing accessory part identifier of the particular roofing accessory part 116.

In some embodiments, the user computing device 101 may include or be incorporated, partially or entirely into at least one personal computer (PC), laptop computer, ultra-laptop computer, tablet, smartphone, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, edge computing device, Internet-of-Things (IoT) device, and so forth.

In some embodiments, the user may manually input the roofing accessory part identifier, e.g., via alphanumeric input using a suitable input device, such as a keyboard, mouse, touch-enabled display, gesture control, etc. In some embodiments, the user computing device 101 may automatically obtain the roofing accessory part identifier via an imaging device 115. In some embodiments, the roofing accessory part identifier may include, e.g., a machine-readable code 117 encoding the roofing accessory part identifier. In some embodiments, the machine-readable code 117 may include, e.g., a barcode, a quick reference (QR) code, or other suitable visible encoding. In some embodiments, the user computing device 101 may automatically obtain the roofing accessory part identifier via a wireless reader device, such as, e.g., a radio-frequency identification (RFID) reader, a near field communication (NFC) reader, a Bluetooth® receiver, a WiFi receiver, or other suitable wireless reader device configured to read data encoded in a wireless transmission device. In some embodiments, the wireless transmission device may include, e.g., an RFID tag (passive and/or active), an NFC tag, a Bluetooth® transmitter, a WiFi transmitter, a Zigbee transmitter, a Z-Wave transmitter, an ORAN transmitter, an Ultra-Wide Band (UWB) transmitter, a LoRaWAN transmitter or other suitable wireless transmission device configured to convey a wireless signal encoding the roofing accessory part identifier, or any combination thereof. In some embodiments, purely for illustration, the user computing device 101 is depicted as obtaining the roofing accessory part identifier via the image capture device 115 to capture an image of the machine-readable code 117.

In some embodiments, the user computing device 101 may automatically detect the presence of the particular roofing accessory part 116 and automatically read the machine-readable code 117, e.g., via NFC, RFID, Bluetooth, WiFi, Zigbee, Z-Wave, LoRaWAN, ORAN, etc. Upon reading the machine-readable code 117, the user computing device 101 may automatically register the particular roofing accessory part 116 with the roofing accessory database 114.

Alternatively, or additionally, in some embodiments, the roofing accessory part identifier may be automatically registered with the roofing accessory database 114. In some embodiments, the particular roofing accessory part 116 may include, e.g., an embedded computing device, such as an edge computing device, Internet-of-Things (IoT) device. The embedded computing device may include, e.g., a wireless communication connection, such as, e.g., WiFi, Zigbee, Z-Wave, 5G, 4G, 3G, or other data and/or cellular connection. As a result, upon installation (e.g., upon being provided with power or a power connection, or upon manual activation during installation), the particular roofing accessory part 116 may use the embedded computing device to connect with the roofing accessory database 114, e.g., using a suitable wireless communication connection over a suitable network (e.g., WiFi network, Ethernet network, Local Area Network (LAN), IoT or smart home network, the Internet, or other suitable network or any combination thereof).

In some embodiments, upon receiving the roofing accessory part identifier, the user computing device 101 and/or the embedded computing device may upload the roofing accessory part identifier using, e.g., a suitable database query, to identify and access the record associated with the particular roofing accessory part 116 in the roofing accessory database 114. In some embodiments, the user computing device 101 may upload the roofing accessory part identifier via, e.g., a suitable network. In some embodiments, the network may include a suitable network type, such as, e.g., a local-area network (LAN), a wide-area network (WAN) or other suitable type. In some embodiments, a LAN may connect computers and peripheral devices in a physical area, such as a business office, laboratory, or college campus, by means of links (wires, Ethernet cables, fiber optics, wireless such as Wi-Fi, etc.) that transmit data. In some embodiments, a LAN may include two or more personal computers, printers, and high-capacity disk-storage devices called file servers, which enable each computer on the network to access a common set of files. LAN operating system software, which interprets input and instructs networked devices, may enable communication between devices to: share the printers and storage equipment, simultaneously access centrally located processors, data, or programs (instruction sets), and other functionalities. Devices on a LAN may also access other LANs or connect to one or more WANs. In some embodiments, a WAN may connect computers and smaller networks to larger networks over greater geographic areas. A WAN may link the computers by means of cables, optical fibers, or satellites, or other wide-area connection means. In some embodiments, an example of a WAN may include the Internet.

In some embodiments, the user computing device 101 may upload the roofing accessory part identifier using a suitable network communication technology, including, e.g., a suitable routing/communication protocol (e.g., hypertext transport protocol (HTTP), etc.), and/or a suitable interfacing technology, such as, e.g., an application programming interface (API). In some embodiments, the API may include, e.g., a computing interface that defines interactions between multiple software intermediaries. An "application programming interface" or "API" defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation.

In some embodiments, in response to the roofing accessory part identifier, the roofing accessory database 114 may return the record associated with the particular roofing accessory part 116. In some embodiments, user computing device 101 may then present a suitable graphical user interface (GUI) for presenting the record to the user. In some embodiments, the GUI may provide user interface elements for viewing and/or editing characteristics stored in the record, including, e.g., the performance data and/or the mechanical data associated with the particular roofing accessory part 116.

In some embodiments, where the GUI provides user interface elements for editing characteristics of the particular roofing accessory part 116, the user may select and/or input modifications to the characteristics, such as, e.g., a current performance according to most recent measurements, a current mechanical condition, a current state (e.g., brand new, installed, uninstalled, reused/reinstalled, etc.), among other characteristics or any combination thereof. In some embodiments, each edit may be appended to the record in order to provide a timeline of the lifetime of the particular roofing accessory part 116.

For example, when selected for a particular roofing system, the user may scan the machine-readable indicia 117 with the imaging device 115 via the user computing device 101. In some embodiments, the user computing device 101 may upload the roofing accessory part identifier encoded in the machine-readable indicia 117 to access the record and the characteristics stored therein. The user may then edit the record to indicate that a status as installed upon installing the particular roofing accessory part 116 in the roofing system. In some embodiments, the user may then re-scan the machine-readable indicia 117 to access the record and update changes to the characteristics including performance data and/or mechanical data, or any change in status, such as a time at which the particular roofing accessory part 116 is uninstalled from the roofing system (e.g., to be replaced with a new or different roofing accessory part). In some embodiments, where the particular roofing accessory part 116 may still be employed in a roofing system based on the most recent performance data and/or mechanical data upon uninstallation based on the record, the particular roofing accessory part 116 may be recycled and selected for a new roofing system (e.g., to be sold at a reduced cost or reused by the owner of the original roofing system, etc.). Thus, the particular roofing accessory part 116 may be recycled one or more times, with each status change including each installation and each uninstallation recorded in the record stored in the roofing accessory database 114. Accordingly, the roofing accessory database 114 may record a full lifecycle of each roofing accessory part, including solar roofing accessory parts, active roofing accessory parts and/or inactive roofing accessory parts.

Figure 1B:
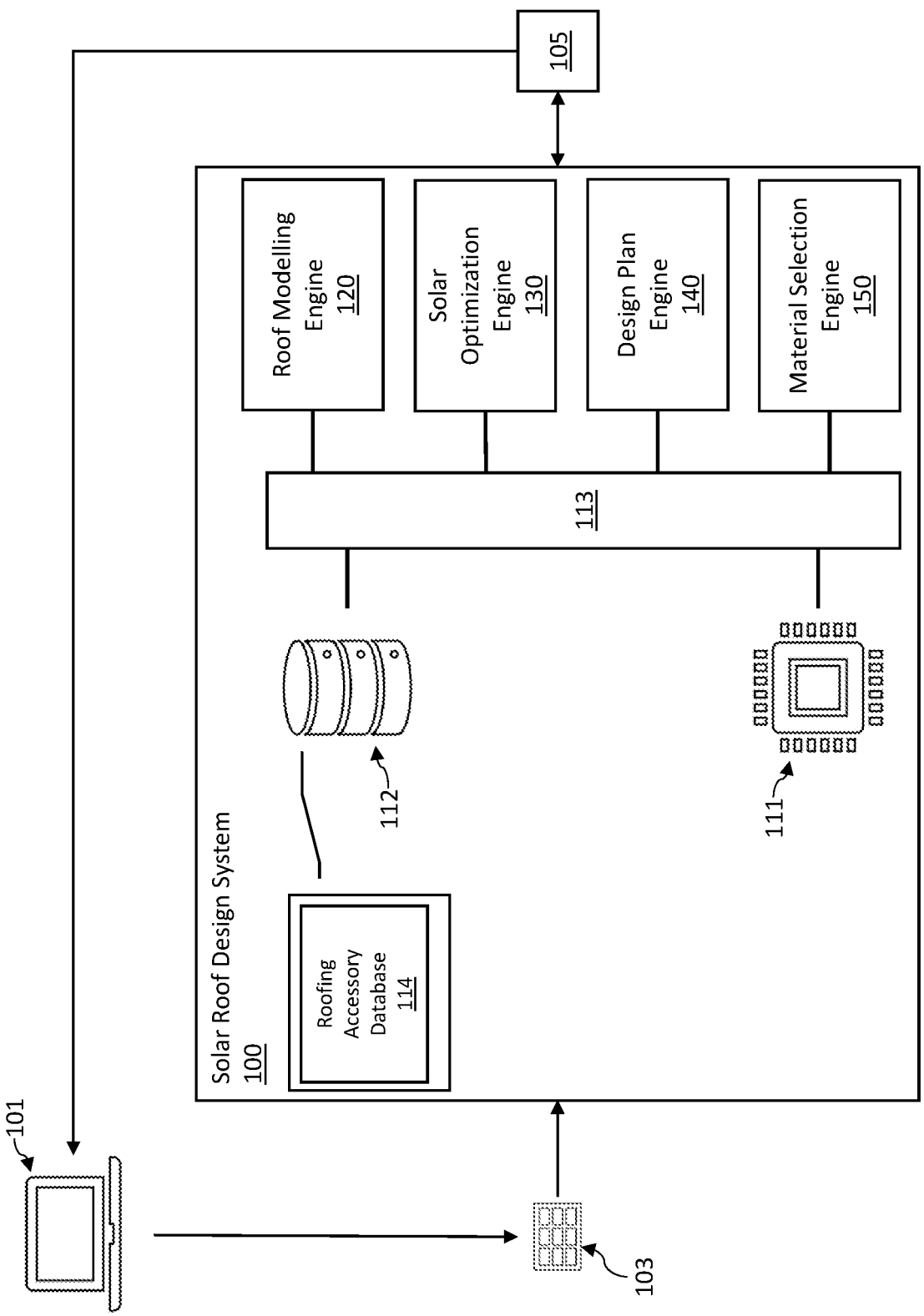
FIG. 1B is a block diagram of an exemplary computer-based system configured for facilitating exemplary method(s) for designing, manufacturing, installing, and/or maintenance of a solar roof in accordance with one or more embodiments of the present disclosure.

FIG. 1B is a block diagram of an exemplary computer-based system for solar roof design in accordance with one or more embodiments of the present disclosure.

In some embodiments, in response to a solar roof design request 103, a solar roof design system 100 may produce solar roof designs 105 based on a predicted performance of a particular roof layout using the roofing accessory database 114 of data for roofing accessories including per-accessory specifications and performance data for each roofing accessory available. Such roofing accessories include one or more, e.g., solar roofing accessory(s) (e.g., solar panel(s), solar shingle(s), solar panel(s)/shingle(s) parts, electrical accessory(s), etc.), shingle(s), underlayment(s), waterproof membrane(s), decking, roofing accessory(s)/accessory(ies) having integrated and/or embedded electronic accessories, antenna(s), roofing cap(s), laminate roofing accessory(ies), roofing sheet(s), ridge cap(s), ridge vent(s), roofing frame(s) and the like, or any combination thereof.

Some embodiments of the present disclosure relate to at least one roofing accessory. Some embodiments of the present disclosure include a plurality of roofing accessories. Some embodiments of the present disclosure include at least three roofing accessories. Some embodiments of the present disclosure include at least five roofing accessories. Some embodiments of the present disclosure include at least ten roofing accessories. Some embodiments of the present disclosure include at least fifty roofing accessories. Some embodiments of the present disclosure include at least one hundred roofing accessories. Some embodiments of the present disclosure include at least one-thousand roofing accessories.

In some embodiments, there are 1 to 10,000 roofing accessories. In some embodiments there are 1 to 5000 roofing accessories. In some embodiments, there are 1 to 1000 roofing accessories. In some embodiments, there are 1 to 100 roofing accessories. In some embodiments, there are 1 to 50 roofing accessories. In some embodiments, there are 1 to 25 roofing accessories. In some embodiments, there are 1 to 10 roofing accessories. In some embodiments, there are 1 to 5 roofing accessories. In some embodiments, there are 1 to 2 roofing accessories.

In some embodiments, there are 2 to 10,000 roofing accessories. In some embodiments, there are 5 to 10,000 roofing accessories. In some embodiments, there are 10 to 10,000 roofing accessories. In some embodiments, there are 50 to 10,000 roofing accessories. In some embodiments, there are 100 to 10,000 roofing accessories. In some embodiments, there are 500 to 10,000 roofing accessories. In some embodiments, there are 1000 to 10,000 roofing accessories. In some embodiments, there are 5000 to 10,000 roofing accessories.

In some embodiments, there are 2 to 5000 roofing accessories. In some embodiments, there are 5 to 1000 roofing accessories. In some embodiments, there are 10 to 5000 roofing accessories. In some embodiments, there are 50 to 100 roofing accessories. In some embodiments, there are 60 to 90 roofing accessories. In some embodiments, there are 70 to 80 roofing accessories.

Non-limiting examples of the at least one electronic accessory of the at least one roofing accessory include: at least one antenna, at least one solar array, at least one battery, at least one computing device, at least one controller, at least one processor, the like, or any combination thereof. The at least one electronic accessory may also include one or more processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

In some embodiments, the roofing accessory database 114 may include performance data for each roofing accessory, where each roofing accessory refers to a part/model number and/or name, a serial number for a physical accessory, or any combination thereof. In some embodiments, the performance data may include solar performance, such as, e.g., rated temperature range, rated load capacity, rated impact limit, rated efficiency, measured temperature range, measured load capacity, measured impact limit, measured efficiency, average defect(s) quantity, measured defect(s) quantity, time-based performance change, usage-based performance change, quality and/or performance binning, quality control results, or other solar accessory performance metric or any combination thereof. In some embodiments, the performance data may include electronic performance, such as, e.g., rated processing speed, rated throughput, rated efficiency, measured processing speed, measured throughput, measured efficiency, average defect(s) quantity, measured defect(s) quantity, time-based performance change, usage-based performance change, quality and/or performance binning, quality control results, or other electronic accessory performance metric or any combination thereof. In some embodiments, the performance data may include mechanical performance, such as, e.g., rated load capacity, rated weatherproofing capacity (e.g., waterproofing and/or wind proofing, etc.), rated insulation performance, rated temperature range, rated lifetime, measured load capacity, measured weatherproofing capacity (e.g., waterproofing and/or wind proofing, etc.), measured insulation performance, measured temperature range, average defect(s) quantity, measured defect(s) quantity, time-based performance change, usage-based performance change, quality control results, or other mechanical accessory performance metric or any combination thereof.

In some embodiments, the roofing accessory database 114 may include manufacturing-related data for each roofing accessory. In some embodiments, the manufacturing-related data may include, e.g., temperature during manufacturing, humidity during manufacturing, time of manufacture, time and/or duration to complete manufacturing, line speed, process information, present during manufacturing, quality assurance status, production run identifier, among manufacturing-related data or any combination thereof.

In some embodiments, the solar roof design system 100 may produce solar roof designs 105 including, e.g., an integrated solar shingle roofing system, a comprehensive material and accessory list for a full roofing system, time and cost projections, among other solar roof design data or any combination thereof. In some embodiments, the solar roof design system 100 may leverage the roofing accessory database 114 and user input provided in the solar roof design request 103 to determine an optimized solar roof design 105 for the solar roof design request 103. In some embodiments, an optimized solar roof design 105 may include, e.g., an optimization based on solar efficiency maximization, peak power generation maximization, average power generation maximization, minimum power generation maximization, cost minimization, construction time minimization, lifespan maximization, or any other suitable solar roof optimization metric or suitable balancing thereof. Accordingly, in some embodiments, the solar roof design system 100 may minimize cost and waste for the roofing contractor by optimizing the roofing system design, identifying the amount of material needed, and providing the contractor with guidance on where to place the material when constructing the roof to maximize solar production and minimize labor, material waste based on data about each solar and non-solar roofing accessory and/or the specific characteristics thereof.

In some embodiments, the solar roof design system 100 may receive the solar roof design request 103 in response to user input via the user computing device 101. In some embodiments, the solar roof design request 103 may include, for example, but not limited to, a physical structure identifier selected and/or input by a user via the user computing device 101, roof-related data represented within the solar roof design request 103 itself as selected and/or input by a user via the user computing device 101, or any combination thereof. In some embodiments, the solar roof design system 100 may be a part of the user computing device 101. Thus, the solar roof design system 100 may include hardware and software accessories including, e.g., user computing device 101 hardware and software, cloud or server hardware and software, or a combination thereof.

In some embodiments, the solar roof design system 100 may include hardware accessories such as a processor 111, which may include local or remote processing accessories. In some embodiments, the processor 111 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 111 may include data-processing capacity provided by the microprocessor. In some embodiments, the microprocessor may include memory, processing, interface resources, controllers, and counters. In some embodiments, the microprocessor may also include one or more programs stored in memory.

Similarly, the solar roof design system 100 may include the storage 112, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the storage 112 may include, e.g., a suitable non-transient computer readable medium such as, e.g., random access memory (RAM), read only memory (ROM), one or more buffers and/or caches, among other memory devices or any combination thereof.

In some embodiments, the terms "cloud," "Internet cloud," "cloud computing," "cloud architecture," "edge compute," "Internet-of-Things," "IoT," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The aforementioned examples are, of course, illustrative and not restrictive.

In some embodiments, the solar roof design system 100 may implement computer engines including, e.g., a roof modelling engine 120 to model the roof of a structure, a solar optimization engine 130 to model and optimize roof layouts, a design plan engine 140 to generate a roof design plan based on the roof layouts and a material selection engine 150 to generate a list of materials and/or tools for constructing the roof design plan. In some embodiments, the terms "computer engine" and "engine" identify at least one software accessory and/or a combination of at least one software accessory and at least one hardware accessory which are designed/programmed/configured to manage/control other software and/or hardware accessories (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software accessories, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, each of the roof modelling engine 120, the solar optimization engine 130, the design plan engine 140 and the material selection engine 150 may include dedicated and/or shared software accessories, hardware accessories, or a combination thereof. For example, each of the roof modelling engine 120, the solar optimization engine 130 and the design plan engine 140 may include a dedicated processor and storage. However, in some embodiments, any combination of the roof modelling engine 120, the solar optimization engine 130 and the design plan engine 140 may share hardware resources, such as the processor 111 and storage 112 of the solar roof design system 100 via, e.g., a bus 113. In some embodiments, the roof modelling engine 120, the solar optimization engine 130 and the design plan engine 140 may use any combination of dedicated and/or shared hardware and/or software resources for executing via one or more processor(s) the tasks, services, functions, etc. thereof.

In some embodiments, one or more of the roof modelling engine 120, the solar optimization engine 130 and the design plan engine 140 may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
   a. define Neural Network architecture/model,
   b. transfer the input data to the exemplary neural network model,
   c. train the exemplary model incrementally,
   d. determine the accuracy for a specific number of timesteps,
   e. apply the exemplary trained model to process the newly-received input data,
   f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the roof modelling engine 120 may ingest the solar roof design request 103 and create a virtual roof model by modelling each roof plane on a roof associated with the solar roof design request 103. Accordingly, in some embodiments, the solar roof design request 103 may include and/or reference roof-related data for a particular roof of a particular physical structure.

In some embodiments, the solar roof design request 103 may include a roof and/or physical structure identifier selected and/or input by a user via the user computing device

101. In some embodiments, using the roof and/or physical structure identifier, the roof modelling engine 120 may access the roof-related data, e.g., in the storage 112. In some embodiments, the solar roof design request 103 may include roof-related data represented within the solar roof design request 103 itself as selected and/or input by a user via the user computing device 101. In some embodiments, each data object of the roof-related data may be included within the solar roof design request 103, accessed in storage 112 via a roof and/or physical structure identifier or provided to the roof modelling engine 120 in any other suitable way, or in any combination thereof.

In some embodiments, the roof-related data may include one or more data objects representing characteristics of the roof of the particular physical structure. In some embodiments, the roof-related data may include, e.g., form-factor for the roofing accessories (e.g., asphalt shingle, tile shingle, etc.), roof compatibility with particular types of installation mounts, one or more digital images representing visual imagery of the roof, one or more light detection and ranging (LiDAR) images representing LiDAR-based measurements of the roof, one or more radar measurements representing radar-based measurements of the roof, location data (e.g., geospatial coordinates, address, zip code, landmark, city and/or town, region, state, territory, province, country, etc.), elevation data (e.g., based on the location data or explicitly defined by measurement), surface topography, geographic data (e.g., cardinal directions, structure orientation, etc.) or other information to characterize the characteristics of a site of the roof. In some embodiments, the roof-related data may include any suitable user input about the roof and/or physical structure, such as, e.g., roof or property characteristics, measurements including length, width, height, pitch, orientation or other remeasurements or any combination thereof, or characteristics about any obstructions which may influence a solar roof design and/or bill of materials.

In some embodiments, the roof modelling engine 120 may ingest the roof-related data associated with the solar roof design request 103 to model each roof plane of the roof. In some embodiments, modelling each roof plane may include determining dimensions of each roof plane to, e.g., characterize the shape of each roof plane. For example, the roof modelling engine 120 may determine, e.g., height, width, length, pitch, among other dimensions or any combination thereof. In some embodiments, the term "roof plane" refers to an individual planar portion of a roof, where a roof may have one or more roof planes connected by edges and/or ridges between adjacent roof planes.

In some embodiments, the roof modelling engine 120 may determine dimensions of each roof plane based on, e.g., measurements provided by the roof-related data. Additionally or alternatively, the roof modelling engine 120 may implement one or more machine learning models to process images and/or LiDAR images of the roof. In certain embodiments, the roof modelling engine 123 may implement one or more machine learning or artificial intelligence models to process content, such as video content of the roof, a structure, an environment in which the structure is located, or any combination thereof. For example, a camera, vehicle, sensor, other device, or any combination thereof, may be positioned in a vicinity of the structure may be utilized to capture content including, but not limited to, the video content, image content, audio content, audiovisual content, other content, or any combination thereof. In certain embodiments, the captured content may be combined with computer-generated content to create augmented reality content that may be utilized by the roof modelling engine 123 to facilitate the generating of a solar design for a roof. In certain embodiments, the roof modelling engine 123 may similarly utilize machine learning or artificial intelligence models to process augmented reality content that includes a combination of virtual reality content and actual video content of the roof, the structure, and/or environment.

In some embodiments, the neural networks described in the present disclosure may be configured to extract features from captured content. Such features may include, but are not limited to, corners, edges, regions of interest points, ridges, location information, colors, gradients, shapes, orientations, other features, or any combination thereof. In certain embodiments, the features may be associated with objects present in the content, an environment present in the content, anything in the content, or any combination thereof. In certain embodiments, the received content may be passed through a filter to generate a feature map of the content, which may be utilized to facilitate visualization of the features. In certain embodiments, the feature map may be divided into image/content patches and may be converted into a vector that may be processed by the neural network. In certain embodiments, the feature map, image/content patches, vectors, or any combination thereof, may be utilized to generate local representations of the content, global representations, or any combination thereof. In certain embodiments, the representations of the content may be utilized to facilitate image segmentation, which may involve utilizing a neural network to divide an image (or other content) into different regions based on the characteristics of pixels to identify objects and/or boundaries to efficiently analyze the image. In certain embodiments, the representations of the content may be utilized for object detection, which may involve utilizing a neural network to analyze an image (or other content) to determine the location and the class for each object contained within an image (or other content). In certain embodiments, the representations of the content may be utilized for image classification, which may include utilizing a neural network to extract features from an image (or other content) to classify the image as belonging to one or more of a set of predefined categories. In certain embodiments, the representations may be utilized for content-based image retrieval, which may include utilizing a neural network to search database for content having similarity and/or correlation to content processed by the neural network. In certain embodiments, any type of computer vision technique or function may be utilized to process the images to facilitate generation of roof planes of a roof, simulating candidate roof layouts, generating solar roof designs, or any combination thereof.

In some embodiments, the one or more machine learning models may include image segmentation, object detection, object recognition tasks, content-based image retrieval, any type of detection or recognition technique, or any combination thereof. Accordingly, the one or more machine learning models may be trained to recognize one or more roofing accessories, materials and/or hardware or other roof features of a roof such as, e.g., vent stack(s), skylight(s), chimney(s), ridge vent(s), antenna(s), laminate roofing accessory(ies), roofing sheet(s), ridge cap(s), roofing frame(s), and the like or any combination thereof. In some embodiments, the one or more machine learning models may also or alternatively be trained to recognize one or more obstructions that are situated over the roof, such as, e.g., tree(s), power line(s), nearby structure(s), among other objects that may obstruct a roof plane from sunlight.

In some embodiments, the one or more machine learning models may include algorithms for predicting spatial dimensions based on the visual/LiDAR images, such as distances between roof features on the roof and to ends of each roof plane. Accordingly, the one or more models may include regression based algorithms for interpolating spatial data for each roof plane such as, e.g., roof plane area, roof plane length, roof plane width, roof plane height, roof plane pitch angle, roof feature height, roof feature length, roof feature width, roof feature distance from one or more particular roof plane edge(s), roof feature distance from a roof ridge, etc., and/or for interpolating spatial data for measurements of relative spatial relationships between roof planes, such as, orientation angle between a first and a second roof plane, etc.

In some embodiments, the one or more machine learning models may include algorithms for predicting spatial dimensions of obstructions based on the visual/LiDAR images, such as size and location of one or more non-roof objects relative to each roof plane. Accordingly, the one or more models may include regression based algorithms for interpolating spatial data for each obstruction relative to each roof plane such as, e.g., distance from each roof plane, obstruction height, obstruction width, obstruction length, obstruction area, shadowing area associated with a shadow cast by the obstruction on one or more roof planes, etc.

In some embodiments, the dimensions of each roof plane may be set in a three-dimensional coordinate system including each roof plane of the roof. Thus, the roof modelling engine 120 may translate the measurements of the roof-related data, the spatial dimensions from the one or more machine learning models, or a combination thereof, to construct a three-dimensional model of the roof including each roof plane of the roof and each obstruction. In some embodiments, the three-dimensional model may include, e.g., virtual representation of measurements, locations and/or objects set in a virtual three-dimensional coordinate system.

In some embodiments, the roof modelling engine 120 may orient the three-dimensional model to reflect an orientation of the roof and each roof plane thereof. For example, the three-dimensional model may include, e.g., an orientation according to cardinal directions (north, west, east, south, etc.), a geospatial location (e.g., via latitude-longitude, address, etc.), among other location and orientation information.

In some embodiments, the solar optimization engine 130 may retrieve the three-dimensional model from the roof modelling engine 120, either directly upon output by the roof modelling engine 120, or via a stored three-dimensional model stored, e.g., in the storage 112. In some embodiments, the solar optimization engine 130 may ingest the three-dimensional model, including the dimensions of obstructions, the roof plane dimensions, the three-dimensional model orientation, the obstruction size(s) and location(s), etc.

In some embodiments, may also access the roofing accessory database 114. In some embodiments, the roofing accessory database 114 may include specifications for each roofing accessory part, each roofing accessory model, each roofing accessory type, among other forms roofing accessory specifications or any combination thereof. In some embodiments, the roofing accessory(ies) may include solar roofing accessories, active roofing accessories and/or inactive roofing accessories. In some embodiments, the solar roofing accessories may include one or more solar-based devices configured for installation on a roof, such as photovoltaic devices, including, e.g., a solar shingle, solar panel, a solar panel attachment, among other solar-based devices configured for installation on a roof. In some embodiments, the active roofing accessories may include any suitable electronic components configured to be integrated into roofing accessories for installation on a roof, such as integrated roofing accessories including, e.g., 5G radio integrated roofing accessories, sensor integrated roofing accessories, computing/networking device integrated roofing accessories, or any other suitable roofing accessory having active (e.g., electronic) components integrated therein or any combination thereof. In some embodiments, the inactive roofing accessories may include "conventional" roofing accessories, such as, e.g., shingles, waterproofing membranes, underlayment, roof decking, gutters, ridge vents, ridge caps, etc.

In some embodiments, the roofing accessory database 114 may include types of roofing accessories, including types of solar roofing accessories, such as, e.g., a solar shingle model, a solar shingle type, a solar panel model, a solar panel type, etc. In some embodiments, the term "model" may refer to a manufacturer defined model for items conforming to a particular set of characteristics (e.g., size, use, capabilities, price, etc.). In some embodiments, the term "type" may refer to any grouping of similar items according to overlap in characteristics, such as, e.g., any solar shingle having a particular form factor (e.g., matching an asphalt shingle, matching a tile shingle, constructed of a particular type of substrate or manufacturing process, etc.), including solar shingles of multiple different manufacturer defined models.

In some embodiments, the roofing accessory database 114 may include records for each solar roofing accessory part type/model according to an associated solar roofing accessory part type/model identifier identifying each solar roofing accessory part type/model. In some embodiments, a manufacturer, retailer, contractor, or other administrative user may provide solar roofing accessory parts with associated solar roofing accessory part type/model identifiers via the user computing device 101. In some embodiments, upon entry, the user may define for a particular solar roofing accessory part type/model a set of specifications defining characteristics of the solar roofing accessory part type/model. In some embodiments, the set of specifications may include, e.g., solar roofing accessory type, solar roofing accessory model, dimensions, installation mounts specifying a type of connector, fastener, adapter, etc. used to install the solar roofing accessory part type/model, as well as any solar roofing accessory part type/model performance characteristics. In some embodiments, the solar roofing accessory part type/model performance characteristics may include, e.g., expected solar generation efficiency (e.g., given a particular intensity of light), expected solar generation efficiency under one or more conditions (e.g., cloudy weather, rain, snow, sunny conditions, shade, temperature, humidity level, etc.), expected performance deterioration, among others or any combination thereof. As a result, a record of a particular solar roofing accessory part type/model may be entered into the roofing accessory database 114, e.g., indexed according to the solar roofing accessory part type/model identifier. A separate record may be created for each available solar roofing accessory part type/model to create an inventory of solar roofing accessory part types/models specifying characteristics including performance characteristics, dimensions, capabilities, etc.

In some embodiments, the solar optimization engine 130 may perform a segmentation process to segment each roof plane of the roof according to a matching of roofing accessory specifications to locations on each roof plane in order to define solar roofing accessory part types/models that are usable across each roof plane. In some embodiments, the solar roofing accessory types/models may be selected based on a matching of roof plane characteristics to one or more solar roofing accessory part types/models according to, e.g., a form-factor for the roof (e.g., asphalt shingle, tile shingle, etc.), roof compatibility with particular types of installation mounts, solar roofing accessory part type/model size and/or dimensions, among other characteristics or any combination thereof. For example, based on the size of each roof plane and compatible installation mounts and/or form-factor of roofing accessories, the solar optimization engine 130 may identifying conforming solar roofing accessory types/models.

Based on the conforming solar roofing accessory types/models, the solar optimization engine 130 may produce a set of candidate roof layouts according to one or more combinations that the conforming solar roofing accessory types/models by determining various combinations of the conforming solar roofing accessory types/models that may fit within the roof plane without being cut or modified. The solar optimization engine 130 may algorithmically and/or iteratively test a variety of layouts of roofing accessory parts based on the characteristics of each roofing accessory part to determine a set of roofing accessory parts that may fit on each roof plane of the roof.

In some embodiments, tests of the variety of layouts may include maximizing the area coverage on each roof plane of each combination of the conforming solar roofing accessory types/models. Thus, the variety of layouts may include a quantity of individual solar roofing accessory parts of one or more solar roofing accessory types/models that can fit within each roof plane. In some embodiments, one or more solar roofing accessory types/models may be cut or otherwise divided, while others may not. Thus, the solar optimization engine 130 may maximize the quantity of individual solar roofing accessory parts that may be placed on each roof plane based on the dimensions of each solar roofing accessory type/model and whether each solar roofing accessory type/model may be cut to fit in an area smaller than the associated solar roofing accessory type/model dimensions. Thus, the solar optimization engine 130 may identify for each layout of the variety of layouts roof plane segments in which full sized solar roofing accessory parts may be placed ("full-device placements") and roof plane segments in which partial sized roofing accessory parts may be placed ("partial-device placements") based on the dimensions of each conforming solar roofing accessory type/model and whether each conforming solar roofing accessory type/model may be divided. Based on the iteratively/algorithmically testing of the variety of layouts, the solar optimization engine 130 may identify candidate roof layouts that maximize an area of each roof plane covered by solar roofing accessories according to the solar roofing accessory type/model characteristics and the three-dimensional model of the roof.

In some embodiments, the solar optimization engine 130 may incorporate a number of active roofing accessories specified in the solar roof design request 103, such as one or more roofing accessories having electronic components integrated therewith. Such active roofing accessories may be indivisible and thus cannot be cut down to a partial-sized device to fit in a partial sized segment of the roof. Thus, the area of one or more roof planes may be reduced by an area of the number of active roofing accessories. Thus, the candidate roof layouts may include one or more combinations that include the number of the active roofing accessories in one or more locations across the roof plane(s) of the roof according to the three-dimensional model.

In some embodiments, the solar optimization engine 130 may determine an optimal roof layout of the candidate roof layouts that optimizes solar energy generation performance while minimizing cost and time of construction. Accordingly, the solar optimization engine 130 may simulate each candidate roof layout according to performance characteristics of solar roofing, solar irradiance based on a geospatial location and/or orientation of each roof plane, the three-dimensional model including shaded areas of each roof plane due to the obstructions as well as other suitable solar-related data. For example, the other solar related data may include, e.g., a customer energy consumption profile, utility tariff information, among other suitable solar related data.

In some embodiments, the roofing accessory database 114 may include records including roofing accessory data for each solar roofing accessory part according to an associated solar roofing accessory part identifier identifying each solar roofing accessory part. In some embodiments, a manufacturer, retailer, contractor, or other administrative user may provide solar roofing accessory parts with associated solar roofing accessory part identifiers via the user computing device 101. In some embodiments, upon entry, the user may define for roofing accessory data and for a particular solar roofing accessory part, a set of specifications defining characteristics of the solar roofing accessory part. In some embodiments, the set of specifications may include, e.g., solar roofing accessory type, solar roofing accessory model, dimensions, installation mounts specifying a type of connector, fastener, adapter, etc. used to install the solar roofing accessory part, as well as any solar roofing accessory part performance characteristics specific to the solar roofing accessory part. In some embodiments, the solar roofing accessory part performance characteristics of the roofing accessory data may include, e.g., measured solar generation efficiency (e.g., given a particular intensity of light), measured solar generation efficiency under one or more conditions (e.g., cloudy weather, rain, snow, sunny conditions, shade, temperature, humidity level, etc.), measured quantity of defects, measured and/or expected performance deterioration, among others or any combination thereof. As a result, a record of a particular solar roofing accessory part may be entered into the roofing accessory database 114, e.g., indexed according to the solar roofing accessory part identifier. A separate record may be created for each available solar roofing accessory part to create an inventory of solar roofing accessory parts specifying characteristics including performance characteristics, dimensions, capabilities, etc.

In some embodiments, the roofing accessory database 114 may also include records for other active and inactive roofing accessories indexed according to roofing accessory part identifiers. In some embodiments, each record of the roofing accessories may include a set of specifications including, e.g., roofing accessory type, roofing accessory model, dimensions, installation mounts specifying a type of connector, fastener, adapter, etc. used to install the roofing accessory part, as well as any roofing accessory part performance characteristics specific to each roofing accessory part, including whether each roofing accessory part is active or inactive, whether each roofing accessory may be cut or modified, among other roofing accessory part performance characteristics.

Accordingly, in some embodiments, the solar optimization engine 130 may simulate solar irradiance of each roof plane, shading of each roof plane, and solar energy generation according to the candidate roof layouts by simulating each candidate roof layout with the performance characteristics of solar roofing accessory parts. In some embodiments, to reduce computational resources, the candidate roof layouts may be simulated with expected measures of the performance characteristics based on the solar roofing accessory types/models of each candidate roof layout rather than simulating each candidate roof layout with each available solar roofing accessory part. In some embodiments, the solar optimization engine 130 may simulate each candidate roof layout using a highest performing set of solar roofing accessory parts based on the associated performance characteristics of each solar roofing accessory part. Thus, the simulation may include sequentially locating each solar roofing accessory part into a location in a candidate roof layout, the sequence being defined by a descending order of the performance characteristics of each solar roofing accessory. In some embodiments, the solar optimization engine 130 may simulate every possible combination of solar roofing accessory parts in each candidate roof layout.

In some embodiments, the solar optimization engine 130 may assign to each candidate roof layout a utilization prediction based on the simulation(s) associated each candidate roof layout. In some embodiments, utilization prediction may include, e.g., a utilization score of each candidate roof layout based on, e.g., a predicted installation metric associated with the candidate roof layout (e.g., according to learned parameters learned from a historical of solar roofing accessory part(s) and associated installation metric(s)), the solar roofing accessory part performance characteristic associated with each solar roofing accessory part, and the simulated solar irradiance, shading, etc. In some embodiments, the utilization prediction may include, e.g., a predicted utilization score for each solar roofing accessory part and/or each solar roofing accessory type/model specified in each candidate roof layout based on installation mount, performance characteristics, simulated solar irradiance, simulated shading, dimensions, among other features affecting the performance of installation and solar generation associated with each solar roofing accessory part and/or each solar roofing accessory type/model. In some embodiments, the solar optimization engine 130 may utilize one or more machine learning models to ingest the characteristics of each solar roofing accessory part and/or each solar roofing accessory type/model of each candidate roof layout, the three-dimensional model, and the roofing-related data.

In some embodiments, the solar optimization engine 130 may output a particular roof layout of the candidate roof layouts based on a candidate roof layout having a greatest utilization prediction. In some embodiments, the particular roof layout may define the location on each roof plane of each solar roofing accessory part and each active/inactive roofing accessory ("non-solar roofing accessory parts"). The particular layout may also be defined for each solar roofing accessory part in the particular layout the utilization score according to the location on each roof plane of each solar roofing accessory part.

In some embodiments, the design plan engine 140 may ingest the particular layout and access, e.g., in the storage 112, data indicative of material cost of each solar roofing accessory part and each non-solar roofing accessory part, equipment associated with installation of each solar roofing accessory part and each non-solar roofing accessory part, labor costs associated with installation of each solar roofing accessory part and each non-solar roofing accessory part, installation time associated with each solar roofing accessory part and each non-solar roofing accessory part, among other installation related data or any combination thereof to complete a weatherproof solar roof system.

In some embodiments, based on the installation related data for the particular layout, the design plan engine 140 may determine a solar roof design that includes a list of the solar roofing accessory part identifiers identifying each solar roofing accessory part of the particular layout, as well as equipment, materials, labor time, labor cost, and installation costs associated with constructing the solar roof system on the roof. In some embodiments, the design plan engine 140 may store the solar roof design in the storage 112 using the solar roofing accessory part identifiers to reference the record of each solar roofing accessory part used in the particular layout of the solar roof design.

As a result, the solar roof design may be used to track a lifetime of each solar roofing accessory part used in the solar roof design. For example, a user, such as the construction entity that installed the particular layout, the manufacturer, the owner of the structure associated with the roof, or other user, may provide updates on each solar roofing accessory part. For example, the user may use the user computing device 101 to modify the record of each solar roofing accessory part in the roofing accessory database 114 based on the solar roof design stored in the storage 112 in order to update each record with an indication of installation, any performance deterioration, whether each solar roofing accessory part was cut or otherwise divided, any defects, solar generation performance, among other attributes throughout the lifetime of each solar roofing accessory part. Accordingly, the solar roof design and the roofing accessory database 114 may be employed to track each solar roofing accessory part to enable a user to ascertain if and when a particular solar roofing accessory part needs replacing, as well as for training machine learning models and/or aggregating statistics regarding performance and failure among other lifetime data of each solar roofing accessory part.

In some embodiments, the material selection engine 150 may access the solar roof design to generate a list of materials, components and/or tools for constructing the solar roof design on the roof. In some embodiments, the list of materials, may include, e.g., a type of fastener for securing each roofing accessory part including each solar roofing accessory part to the roof, a number of fasteners needed to secure each roofing accessory part including each solar roofing accessory part to the roof, brackets, adhesives, frames, raw materials (e.g., lumber, brick, stone, cement, asphalt, etc.), wiring, waterproofing, hammer, hammer type, screw driver, screw driver type, drill, drill bits, nail gun, staple gun, or any other material, component and/or tools or any combination thereof.

In some embodiments, the material selection engine 150 may include, e.g., one or more machine learning models for learning one or more materials and/or tools associated with each solar roofing accessory part and/or other roofing accessory part of the solar roof design. Thus, for each roofing accessory part in the solar roof design, the material selection engine 150 may identify the associated materials/components type(s) and a quantity thereof for installing each roofing accessory part. In some embodiments, for some roofing accessory parts, such as shingles, the materials/components may be learned based on features including an area of coverage of the roofing accessory parts, a number of the roofing accessory parts in the solar roof design, a location and/or orientation of the virtual roof model, or other feature or any combination thereof. Similarly, in some embodiments, for solar roofing accessory parts and/or any other electronic roofing accessory parts, the materials/components may be learned based on features include a number of the solar roofing accessory parts and/or electronic roofing accessory parts, an area of coverage of the solar roofing accessory parts, a location and/or orientation of the virtual roof model, or other feature or any combination thereof. In some embodiments, the one or more machine learning models may be trained based on a roof type, such as, e.g., a residential roof, a commercial roof, a roof with wood decking, a roof with non-wood decking, or other type of roof or any combination thereof.

In some embodiments, the material selection engine 150 may include, e.g., a library of material rules and tool rules. In some embodiments, the material rules may include a mapping of a type and an amount of one or more materials and/or components for each solar roofing accessory part or other roofing accessory part. Thus, for each roofing accessory part in the solar roof design, the material selection engine 150 may identify the associated materials/components type(s) and a quantity thereof for installing each roofing accessory part. In some embodiments, for some roofing accessory parts, such as shingles, the materials/components may be mapped based on an area of coverage of the roofing accessory parts or on a number of the roofing accessory parts in the solar roof design. In some embodiments, for solar roofing accessory parts and/or any other electronic roofing accessory parts, the materials/components may be mapped based on a number of the solar roofing accessory parts and/or electronic roofing accessory parts. In some embodiments, the material rules may be based on a roof type, such as, e.g., a residential roof, a commercial roof, a roof with wood decking, a roof with non-wood decking, or other type of roof or any combination thereof.

In some embodiments, the tool rules may include a mapping of a tool or tool type for each solar roofing accessory part, other roofing accessory part and/or material. For example, specific fasteners may be mapped to particular tools (e.g., nails mapped to hammer, Philips head screw mapped to Philips head screw driver, asphalt shingle mapped to nail gun and/or staple gun, etc.). In another example, particular solar roofing accessory parts may be mapped to particular adhesives and/or tools (e.g., mallet, hex wrench, clamp, etc.) for installing the particular solar roofing accessory part. Accordingly, the tool rules may identify a list of tools needed to complete installation of the solar roof design based on the solar roofing accessories, the other roofing accessories and/or the associated materials/components produced by the material rules. In some embodiments, the material selection engine 150 may identify a number of each tool based on, e.g., a number of workers (e.g., input by a user via the user computing device 101), a predetermined number of workers, a roof area, a number of solar roofing accessory parts, a construction timeline (e.g., input by a user via the user computing device 101), among other characteristics of the construction of the solar roof design.

In some embodiments, the material selection engine 150 may correlate a construction timeline and a roof area to a number of workers needed for construction based on an algorithm correlating a construction time per unit area per worker for a roof construction project. Based on the number of workers, the material selection engine 150 may determine the number of tools to maximize worker production and minimize construction time. In some embodiments, the material selection engine 150 may utilize one or more machine learning models to correlate each worker to a construction time and/or construction area over a time period or other metric of productivity. In some embodiments, the correlation may be based on features such as, e.g., solar roofing accessory part to be installed, tool being used, materials needed, time of year, among other features or any combination thereof. Thus, a time to install each roofing accessory part in the solar roof design can be determined, and the total construction timeline can be minimized according to the time to install each roofing accessory part and maximum and/or minimum numbers of workers available.

In some embodiments, the material list and tool list may be added to the solar roof design. In some embodiments, the solar roof design 105 may be output to the user computing device 101 to present the solar roof design 105 to a user such as, e.g., a contractor, installer, manufacture, property owner or other user or any combination thereof. Thus, in some embodiments, the solar roof design system 100 may produce a design for a solar roof system to enable a user to plan for and carry out installation with accurate and optimized layouts of solar roofing accessory parts and the associated costs, time and equipment. Thus, the solar roof design 105 may provide complete and comprehensive bill of materials for the entire roofing system integrating solar and non-solar roofing accessories, a design guide based on optimization of location and count of solar roofing accessory parts and non-solar roofing accessories, providing contractors with multiple solar shingle designs to meet a variety of customer goals, including solar production, cost, aesthetics, among other end uses or any combination thereof.

Figure 2:
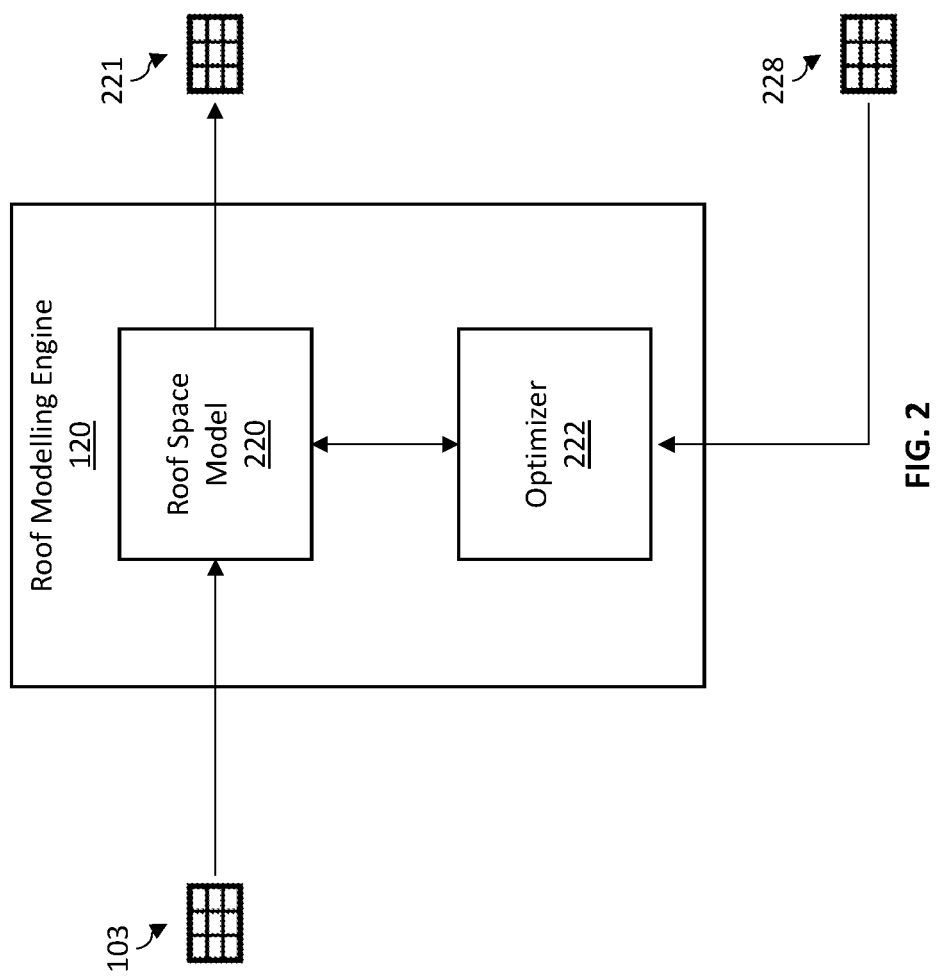
FIG. 2 is a block diagram of an exemplary computer-based system for a solar roof design using automated structural modelling in accordance with one or more embodiments of the present disclosure.

FIG. 2 is a block diagram of an exemplary computer-based system for solar roof design using automated structural modelling in accordance with one or more embodiments of the present disclosure.

In some embodiments, the roof modelling engine 120 may utilize a roof space model 220 to ingest input features of the roof-related data of the solar roof design request 103. In some embodiments, input features of the roof-related data may include imagery such as imagery taken from either aerial or ground locations. The imagery may show the home, the property extents, any structures, trees, obstructions located on the property, and any homes, structures, trees, or obstructions located on adjacent properties within a radius of the home. The input features also include when available, LiDAR data, elevation data, surface topography, geospatial data, structure, roof and/or roof plane orientations with respect to cardinal directions and/or movements of the sun, or other information to help determine the characteristics of the site or any combination thereof. The inputs also include any user input about the property, such as roof or property characteristics, or characteristics about any obstructions which may influence the design or bill of materials.

In some embodiments, the roof space model 220 may ingest the solar roof design request 103 and create a virtual roof model include a virtual model of each roof plane on a roof associated with the solar roof design request 103. In some embodiments, the roof space model 220 may include algorithms for predicting spatial dimensions based on the visual/LiDAR images, such as distances between roof features on the roof and to ends of each roof plane. Accordingly, the one or more models may include regression based algorithms for interpolating spatial data for each roof plane such as, e.g., roof plane area, roof plane length, roof plane width, roof plane height, roof plane pitch angle, roof feature height, roof feature length, roof feature width, roof feature distance from one or more particular roof plane edge(s), roof feature distance from a roof ridge, etc., and/or for interpolating spatial data for measurements of relative spatial relationships between roof planes, such as, orientation angle between a first and a second roof plane, etc.

In some embodiments, the roof space model 220 processes the feature vector with parameters to produces a prediction of spatial data of each roof plane of the roof. In some embodiments, the parameters of the roof space model 220 may be implemented in a suitable machine learning model including a prediction machine learning model, such as, e.g., Linear Regression, Logistic Regression, Ridge Regression, Lasso Regression, Polynomial Regression, Bayesian Linear Regression (e.g., Naive Bayes regression), a convolutional neural network (CNN), a recurrent neural network (RNN), decision trees, random forest, support vector machine (SVM), K-Nearest Neighbors, or any other suitable algorithm for predicting output values based on input values. In some embodiments, for computational efficiency while preserving accuracy of predictions, the roof space model 220 may advantageously include a random forest model.

In some embodiments, the roof space model 220 processes the features encoded in the feature vector by applying the parameters of the prediction machine learning model to produce a model output vector. In some embodiments, the model output vector may be decoded to generate one or more numerical output values indicative of spatial data of each roof plane of the roof. In some embodiments, the model output vector may include or may be decoded to reveal the output value(s) based on a modelled correlation between the feature vector and a target output. In some embodiments, the numerical output may represent spatial data of each roof plane of the roof including, e.g., a three-dimensional virtual model of the roof.

In some embodiments, the parameters of the roof space model 220 may be trained based on known outputs. For example, the roof-related data may be paired with a target value or known value to form a training pair, such as a historical roof-related data and an observed result and/or human annotated value representing a data point in the relationship between the historical roof-related data and spatial data of each roof plane. In some embodiments, the roof-related data may be provided to the roof space model 220, e.g., encoded in a feature vector, to produce a predicted output value. In some embodiments, an optimizer 222 associated with the roof space model 220 may then compare the predicted output value with the known output of a training pair including the historical roof-related data to determine an error of the predicted output value. In some embodiments, the optimizer 222 may employ a loss function, such as, e.g., Hinge Loss, Multi-class SVM Loss, Cross Entropy Loss, Negative Log Likelihood, or other suitable classification loss function to determine the error of the predicted output value based on the known output.

In some embodiments, the known output may be obtained after the roof space model 220 produces the prediction, such as in online learning scenarios. In such a scenario, the roof space model 220 may receive the roof-related data and generate the model output vector to produce an output value representing spatial data of each roof plane of the roof including, e.g., a three-dimensional virtual model of the roof. Subsequently, a user may provide roof model feedback 228 by, e.g., modifying, adjusting, removing, and/or verifying the output value via a suitable roof model feedback 228 mechanism, such as a user interface device (e.g., keyboard, mouse, touch screen, user interface, or other interface mechanism of a user device or any suitable combination thereof). The roof model feedback 228 may be paired with the roof-related data to form the training pair and the optimizer 222 may determine an error of the predicted output value using the roof model feedback 228.

In some embodiments, based on the error, the optimizer 222 may update the parameters of the roof space model 220 using a suitable training algorithm such as, e.g., backpropagation for a prediction machine learning model. In some embodiments, backpropagation may include any suitable minimization algorithm such as a gradient method of the loss function with respect to the weights of the prediction machine learning model. Examples of suitable gradient methods include, e.g., stochastic gradient descent, batch gradient descent, mini-batch gradient descent, or other suitable gradient descent technique. As a result, the optimizer 222 may update the parameters of the roof space model 220 based on the error of predicted labels in order to train the roof space model 220 to model the correlation between roof-related data and spatial data of each roof plane of the roof in order to produce more accurate output values based on roof-related data.

In some embodiments, the dimensions of each roof plane may be set in a three-dimensional coordinate system including each roof plane of the roof. Thus, the roof modelling engine 120 may translate the measurements of the roof-related data, the spatial dimensions from the one or more machine learning models, or a combination thereof, to construct a three-dimensional model of the roof including each roof plane of the roof and each obstruction. In some embodiments, the three-dimensional model may include, e.g., virtual representation of measurements, locations and/or objects set in a virtual three-dimensional coordinate system.

In some embodiments, the roof modelling engine 120 may orient the three-dimensional model to reflect an orientation of the roof and each roof plane thereof. For example, the three-dimensional model may include, e.g., an orientation according to cardinal directions (north, west, east, south, etc.), a geospatial location (e.g., via latitude-longitude, address, etc.), among other location and orientation information.

Figure 3:
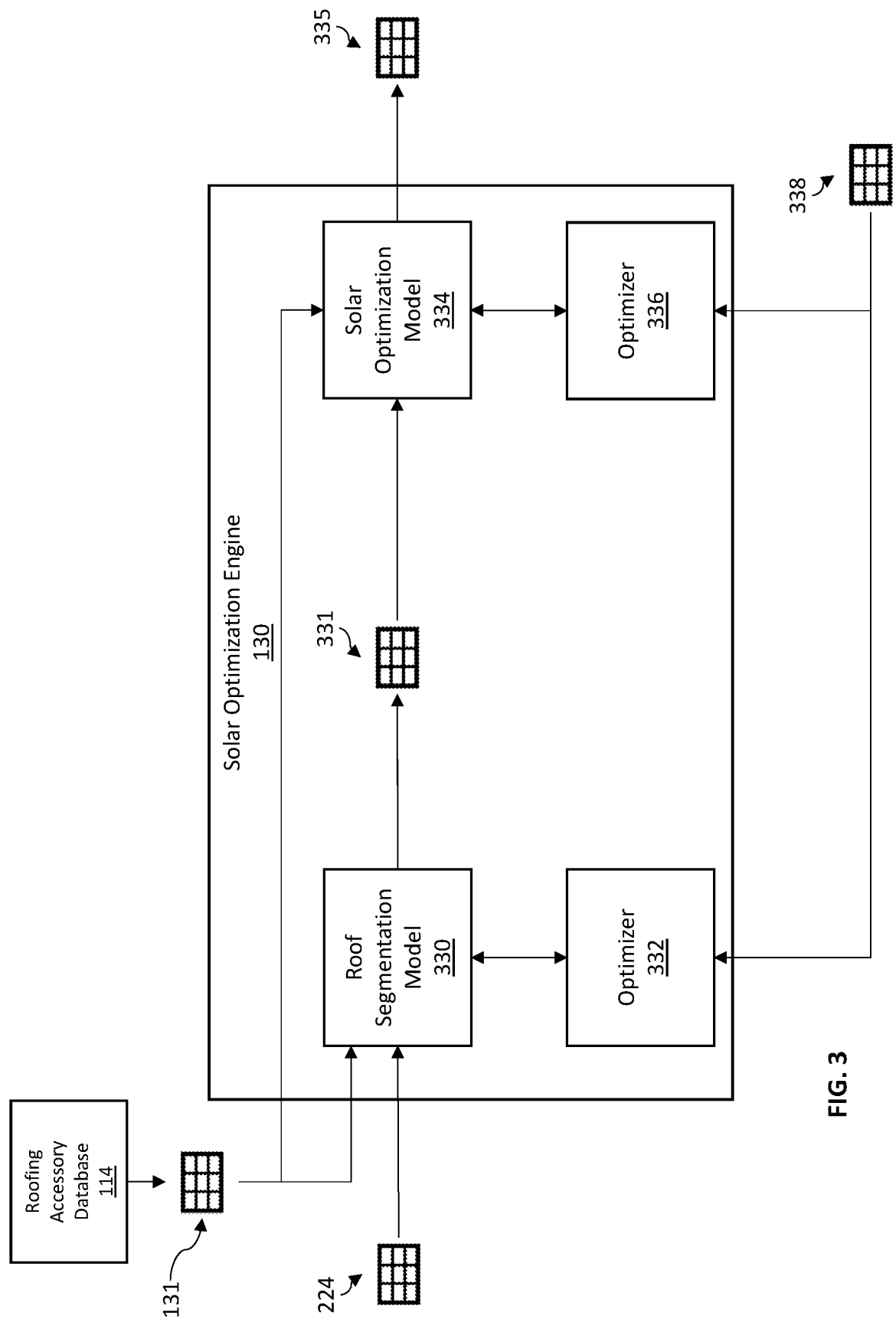
FIG. 3 is a block diagram of an exemplary computer-based system for solar roof design using structure-specific and accessory-specific modelling and analysis based on per-accessory tracking data in accordance with one or more embodiments of the present disclosure.

FIG. 3 is a block diagram of an exemplary computer-based system for solar roof design using structure-specific and accessory-specific modelling and analysis based on per-accessory tracking data in accordance with one or more embodiments of the present disclosure.

In some embodiments, the solar optimization engine 130 may retrieve the three-dimensional model 224 from the roof modelling engine 120, either directly upon output by the roof modelling engine 120, or via a stored three-dimensional model 224 stored, e.g., in the storage 112. In some embodiments, a roof segmentation model 330 of the solar optimization engine 130 may ingest the three-dimensional model 224, including the dimensions of obstructions, the roof plane dimensions, the three-dimensional model orientation, the obstruction size(s) and location(s), etc. In some embodiments, the roof segmentation model 330 may also ingest roofing accessory characteristics 131 of each solar roofing accessory type/model as well as one or more non-solar (active and/or inactive) roofing accessories. In some embodiments, the roof segmentation model 330 of may segment each roof plane of the roof according to candidate locations on each roof plane of both solar and non-solar roofing accessories based on the roofing accessory characteristics 131 and the three-dimensional model 224.

In some embodiments, the roof segmentation model 330 processes the roofing accessory characteristics 131 and the three-dimensional model 224 with parameters to produces a prediction of candidate roof layouts 331. In some embodiments, the parameters of the roof segmentation model 330 may be implemented in a suitable machine learning model including a prediction machine learning model, such as, e.g., Linear Regression, Logistic Regression, Ridge Regression, Lasso Regression, Polynomial Regression, Bayesian Linear Regression (e.g., Naive Bayes regression), a convolutional neural network (CNN), a recurrent neural network (RNN), decision trees, random forest, support vector machine (SVM), K-Nearest Neighbors, or any other suitable algorithm for predicting output values based on input values. In some embodiments, for computational efficiency while preserving accuracy of predictions, the roof segmentation model 330 may advantageously include a random forest model.

In some embodiments, the roof segmentation model 330 processes the features encoded in the roofing accessory characteristics 131 and the three-dimensional model 224 by applying the parameters of the prediction machine learning model to produce a model output vector. In some embodiments, the model output vector may be decoded to generate one or more numerical output values indicative of candidate roof layouts 331. In some embodiments, the model output vector may include or may be decoded to reveal the output value(s) based on a modelled correlation between the roofing accessory characteristics 131 and the three-dimensional model 224 and a target output. In some embodiments, the numerical output may represent candidate roof layouts 331.

In some embodiments, the parameters of the roof segmentation model 330 may be trained based on known outputs. For example, the roofing accessory characteristics 131 and the three-dimensional model 224 may be paired with a target value or known value to form a training pair, such as a historical roofing accessory characteristics 131 and the three-dimensional model 224 and an observed result and/or human annotated value representing a data point in the relationship between the historical roofing accessory characteristics 131 and the three-dimensional model 224 and candidate roof layouts 331. In some embodiments, the roofing accessory characteristics 131 and the three-dimensional model 224 may be provided to the roof segmentation model 330, e.g., encoded in a roofing accessory characteristics 131 and the three-dimensional model 224, to produce a predicted output value. In some embodiments, an optimizer 332 associated with the roof segmentation model 330 may then compare the predicted output value with the known output of a training pair including the historical roofing accessory characteristics 131 and the three-dimensional model 224 to determine an error of the predicted output value. In some embodiments, the optimizer 332 may employ a loss function, such as, e.g., Hinge Loss, Multiclass SVM Loss, Cross Entropy Loss, Negative Log Likelihood, or other suitable classification loss function to determine the error of the predicted output value based on the known output.

In some embodiments, tests of the variety of layouts may include maximizing the area coverage on each roof plane of each combination of the conforming solar roofing accessory types/models. Thus, the variety of layouts may include a quantity of individual solar roofing accessory parts of one or more solar roofing accessory types/models that can fit within each roof plane. In some embodiments, one or more solar roofing accessory types/models may be cut or otherwise divided, while others may not. Thus, the roof segmentation model 330 may maximize the quantity of individual solar roofing accessory parts that may be placed on each roof plane based on the dimensions of each solar roofing accessory type/model and whether each solar roofing accessory type/model may be cut to fit in an area smaller than the associated solar roofing accessory type/model dimensions. Thus, the roof segmentation model 330 may identify for each layout of the variety of layouts roof plane segments in which full sized solar roofing accessory parts may be placed ("full-device placements") and roof plane segments in which partial sized roofing accessory parts may be placed ("partial-sized placements") based on the dimensions of each conforming solar roofing accessory type/model and whether each conforming solar roofing accessory type/model may be divided.

In some embodiments, the roof segmentation model 330 may incorporate a number of active roofing accessories specified in the solar roof design request 103, such as one or more roofing accessories having electronic components integrated therewith. Such active roofing accessories may be divisible or indivisible. In some embodiments, active roofing accessories that are divisible may be cut or otherwise divided to form a partial sized active roofing accessory from a full-sized active roofing accessory in order to file the partial sized active roofing accessory within the partial sized segment of the roof. In some embodiments, active roofing accessories that are indivisible cannot be cut to fit in a partial sized segment of the roof. Thus, the area of one or more roof planes may be reduced by an area of the number of active roofing accessories. Thus, the candidate roof layouts may include one or more combinations that include the number of the active roofing accessories in one or more locations across the roof plane(s) of the roof according to the three-dimensional model.

In some embodiments, the solar optimization engine 130 may determine an optimal roof layout of the candidate roof layouts 331 that optimizes solar energy generation performance while minimizing cost and time of construction. Accordingly, a solar optimization model 334 of the solar optimization engine 130 may simulate each candidate roof layout 331 according to performance characteristics of solar roofing, solar irradiance based on a geospatial location and/or orientation of each roof plane, the three-dimensional model including shaded areas of each roof plane due to the obstructions as well as other suitable solar-related data. For example, the other solar related data may include, e.g., a customer energy consumption profile, utility tariff information, among other suitable solar related data. Accordingly, in some embodiments, the solar optimization model 334 may simulate solar irradiance of each roof plane, shading of each roof plane, and solar energy generation according to the candidate roof layouts 331 by simulating each candidate roof layout 331 with the roofing accessory characteristics 131 of solar roofing accessory parts.

In some embodiments, the solar optimization model 334 may produce a prediction of a solar score for each solar roofing accessory part of each candidate roof layout 331 to thereby predict a utilization prediction 335 for each candidate roof layout 331. In some embodiments, the parameters of the solar optimization model 334 may be implemented in a suitable machine learning model including a prediction machine learning model, such as, e.g., Linear Regression, Logistic Regression, Ridge Regression, Lasso Regression, Polynomial Regression, Bayesian Linear Regression (e.g., Naive Bayes regression), a convolutional neural network (CNN), a recurrent neural network (RNN), decision trees, random forest, support vector machine (SVM), K-Nearest Neighbors, or any other suitable algorithm for predicting output values based on input values. In some embodiments, for computational efficiency while preserving accuracy of predictions, the solar optimization model 334 may advantageously include a random forest model.

In some embodiments, the solar optimization model 334 processes the features encoded in the feature vector by applying the parameters of the prediction machine learning model to produce a model output vector. In some embodiments, the model output vector may be decoded to generate one or more numerical output values indicative of the score of each solar roofing accessory part and/or the utilization prediction of each candidate roof layout 331. In some embodiments, the model output vector may include or may be decoded to reveal the output value(s) based on a modelled correlation between the feature vector and a target output. In some embodiments, the numerical output may represent the score of each solar roofing accessory part and/or the utilization prediction of each candidate roof layout 331.

In some embodiments, the parameters of the solar optimization model 334 may be trained based on known outputs. For example, the candidate roof layout 331 may be paired with a target value or known value to form a training pair, such as a historical candidate roof layout 331 and an observed result and/or human annotated value representing a data point in the relationship between the historical candidate roof layout 331 and a known score of each solar roofing accessory part and/or utilization prediction of each candidate roof layout 331. In some embodiments, the candidate roof layout 331 may be provided to the solar optimization model 334, e.g., encoded in a feature vector, to produce a predicted output value. In some embodiments, an optimizer 336 associated with the solar optimization model 334 may then compare the predicted output value with the known output of a training pair including the historical candidate roof layout 331 to determine an error of the predicted output value. In some embodiments, the optimizer 336 may employ a loss function, such as, e.g., Hinge Loss, Multi-class SVM Loss, Cross Entropy Loss, Negative Log Likelihood, or other suitable classification loss function to determine the error of the predicted output value based on the known output.

In some embodiments, the known output may be obtained after the solar optimization model 334 produces the prediction, such as in online learning scenarios. In such a scenario, the solar optimization model 334 may receive the candidate roof layouts 331 and generate the model output vector to produce an output value representing the score of each solar roofing accessory part and/or the utilization prediction of each candidate roof layout 331. Subsequently, a user may provide feedback 338 by, e.g., modifying, adjusting, removing, and/or verifying the output value via a suitable feedback 338 mechanism, such as a user interface device (e.g., keyboard, mouse, touch screen, user interface, or other interface mechanism of a user device or any suitable combination thereof). The feedback 338 may be paired with the candidate roof layouts 331 to form the training pair and the optimizer 336 may determine an error of the predicted output value using the feedback 338.

In some embodiments, based on the error, the optimizer 336 may update the parameters of the solar optimization model 334 using a suitable training algorithm such as, e.g., backpropagation for a prediction machine learning model. In some embodiments, backpropagation may include any suitable minimization algorithm such as a gradient method of the loss function with respect to the weights of the prediction machine learning model. Examples of suitable gradient methods include, e.g., stochastic gradient descent, batch gradient descent, mini-batch gradient descent, or other suitable gradient descent technique. As a result, the optimizer 336 may update the parameters of the solar optimization model 334 based on the error of predicted labels in order to train the solar optimization model 334 to model the correlation between candidate roof layouts 331 and the score of each solar roofing accessory part and/or the utilization prediction of each candidate roof layout 331 in order to produce more accurate output values based on candidate roof layout 331.

In some embodiments, the known output for the roof segmentation model 330 may similarly be obtained after the roof segmentation model 330 and/or the solar optimization model 334 produces the prediction, such as in online learning scenarios. In such a scenario, the roof segmentation model 330 may receive the roofing accessory characteristics 131 and the three-dimensional model 224 and generate the model output vector to produce output values representing candidate roof layouts 331. Subsequently, a user may provide feedback 338 by, e.g., modifying, adjusting, removing, and/or verifying the output value via a suitable feedback 338 mechanism, such as a user interface device (e.g., keyboard, mouse, touch screen, user interface, or other interface mechanism of a user device or any suitable combination thereof). The feedback 338 may be paired with the roofing accessory characteristics 131 and the three-dimensional model 224 to form the training pair and the optimizer 332 may determine an error of the predicted output value using the feedback 338.

In some embodiments, based on the error, the optimizer 332 may update the parameters of the roof segmentation model 330 using a suitable training algorithm such as, e.g., backpropagation for a prediction machine learning model. In some embodiments, backpropagation may include any suitable minimization algorithm such as a gradient method of the loss function with respect to the weights of the prediction machine learning model. Examples of suitable gradient methods include, e.g., stochastic gradient descent, batch gradient descent, mini-batch gradient descent, or other suitable gradient descent technique. As a result, the optimizer 332 may update the parameters of the roof segmentation model 330 based on the error of predicted labels in order to train the roof segmentation model 330 to model the correlation between roofing accessory characteristics 131 and the three-dimensional model 224 and candidate roof layouts 331 in order to produce more accurate output values based on roofing accessory characteristics 131 and the three-dimensional model 224.

Figure 4:
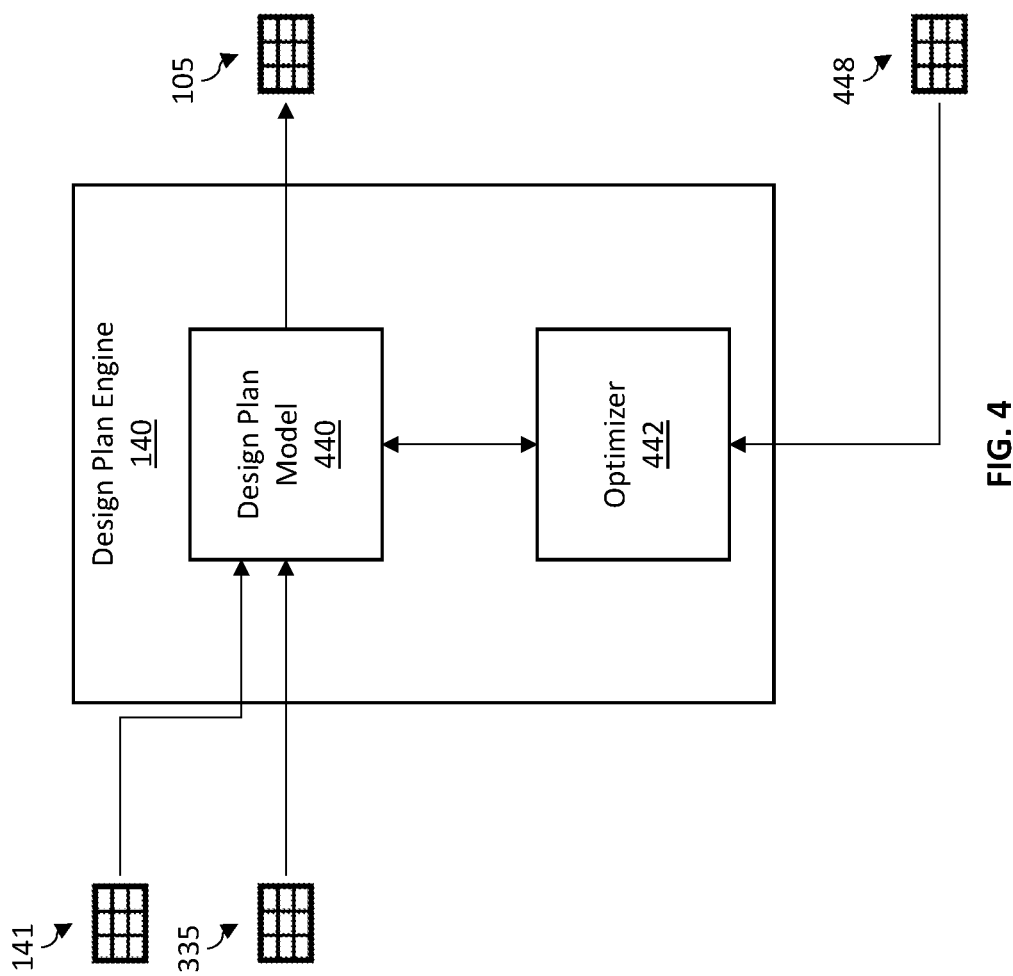
FIG. 4 is a block diagram of an exemplary computer-based system for solar roof design including automated design plan prediction in accordance with one or more embodiments of the present disclosure.

FIG. 4 is a block diagram of an exemplary computer-based system for solar roof design including automated design plan prediction in accordance with one or more embodiments of the present disclosure.

In some embodiments, the design plan engine 140 may ingest a particular layout associated with the candidate roof layout having the highest utilization prediction 335 predicted by the solar optimization model 334. In some embodiments, the design plan engine 140 may utilize a design plan model 440 to automatically ingest the particular layout and, e.g., solar roofing system construction data 141 such as, e.g., the material cost of each solar roofing accessory part and each non-solar roofing accessory part, the equipment associated with installation of each solar roofing accessory part and each non-solar roofing accessory part, the labor costs associated with installation of each solar roofing accessory part and each non-solar roofing accessory part, the installation time associated with each solar roofing accessory part and each non-solar roofing accessory part, among other solar roofing system construction data 141 or any combination thereof to complete a weatherproof solar roof system.

In some embodiments, the design plan model 440 processes the feature vector with parameters to produces a prediction of solar roof design 105. In some embodiments, the parameters of the design plan model 440 may be implemented in a suitable machine learning model including a prediction machine learning model, such as, e.g., Linear Regression, Logistic Regression, Ridge Regression, Lasso Regression, Polynomial Regression, Bayesian Linear Regression (e.g., Naive Bayes regression), a convolutional neural network (CNN), a recurrent neural network (RNN), decision trees, random forest, support vector machine (SVM), K-Nearest Neighbors, or any other suitable algorithm for predicting output values based on input values. In some embodiments, for computational efficiency while preserving accuracy of predictions, the design plan model 440 may advantageously include a random forest model.

In some embodiments, the design plan model 440 processes the features encoded in the feature vector by applying the parameters of the prediction machine learning model to produce a model output vector. In some embodiments, the model output vector may be decoded to generate one or more numerical output values indicative of solar roof design 105. In some embodiments, the model output vector may include or may be decoded to reveal the output value(s) based on a modelled correlation between the feature vector and a target output. In some embodiments, the numerical output may represent a solar roof design 105 including a comprehensive whole roofing system including location of active and inactive solar shingles, a design optimized to balance installation cost against production value and customer energy needs, and a full BOM for all roofing and solar related components.

In some embodiments, the parameters of the design plan model 440 may be trained based on known outputs. For example, the particular layout and the solar roofing system construction data 141 may be paired with a target value or known value to form a training pair, such as a historical the particular layout and the solar roofing system construction data 141 and an observed result and/or human annotated value representing a data point in the relationship between the historical the particular layout and the solar roofing system construction data 141 and the solar roof design 105. In some embodiments, the particular layout and the solar roofing system construction data 141 may be provided to the design plan model 440, e.g., encoded in a feature vector, to produce a predicted output value. In some embodiments, an optimizer 442 associated with the design plan model 440 may then compare the predicted output value with the known output of a training pair including the historical the particular layout and the solar roofing system construction data 141 to determine an error of the predicted output value. In some embodiments, the optimizer 442 may employ a loss function, such as, e.g., Hinge Loss, Multi-class SVM Loss, Cross Entropy Loss, Negative Log Likelihood, or other suitable classification loss function to determine the error of the predicted output value based on the known output.

In some embodiments, the known output may be obtained after the design plan model 440 produces the prediction, such as in online learning scenarios. In such a scenario, the design plan model 440 may receive the particular layout and the solar roofing system construction data 141 and generate the model output vector to produce an output value representing the solar roof design 105. Subsequently, a user may provide feedback 448 by, e.g., modifying, adjusting, removing, and/or verifying the output value via a suitable feedback 448 mechanism, such as a user interface device (e.g., keyboard, mouse, touch screen, user interface, or other interface mechanism of a user device or any suitable combination thereof). The feedback 448 may be paired with the particular layout and the solar roofing system construction data 141 to form the training pair and the optimizer 442 may determine an error of the predicted output value using the feedback 448.

In some embodiments, based on the error, the optimizer 442 may update the parameters of the design plan model 440 using a suitable training algorithm such as, e.g., backpropagation for a prediction machine learning model. In some embodiments, backpropagation may include any suitable minimization algorithm such as a gradient method of the loss function with respect to the weights of the prediction machine learning model. Examples of suitable gradient methods include, e.g., stochastic gradient descent, batch gradient descent, mini-batch gradient descent, or other suitable gradient descent technique. As a result, the optimizer 442 may update the parameters of the design plan model 440 based on the error of predicted labels in order to train the design plan model 440 to model the correlation between the particular layout and the solar roofing system construction data 141 and solar roof design 105 in order to produce more accurate output values based on the particular layout and the solar roofing system construction data 141.

In some embodiments, the solar roof design 105 may be output to the user computing device 101 to present the solar roof design 105 to a user such as, e.g., a contractor, installer, manufacture, property owner or other user or any combination thereof. Thus, the solar roof design system 100 may produce a design for a solar roof system to enable a user to plan for and carry out installation with accurate and optimized layouts of solar roofing accessory parts and the associated costs, time and equipment. Thus, the solar roof design 105 may provide complete and comprehensive bill of materials for the entire roofing system integrating solar and non-solar roofing accessories, a design guide based on optimization of location and count of solar roofing accessory parts and non-solar roofing accessories, providing contractors with multiple solar shingle designs to meet a variety of customer goals, including solar production, cost, aesthetics, among other end uses or any combination thereof.

Figure 5:
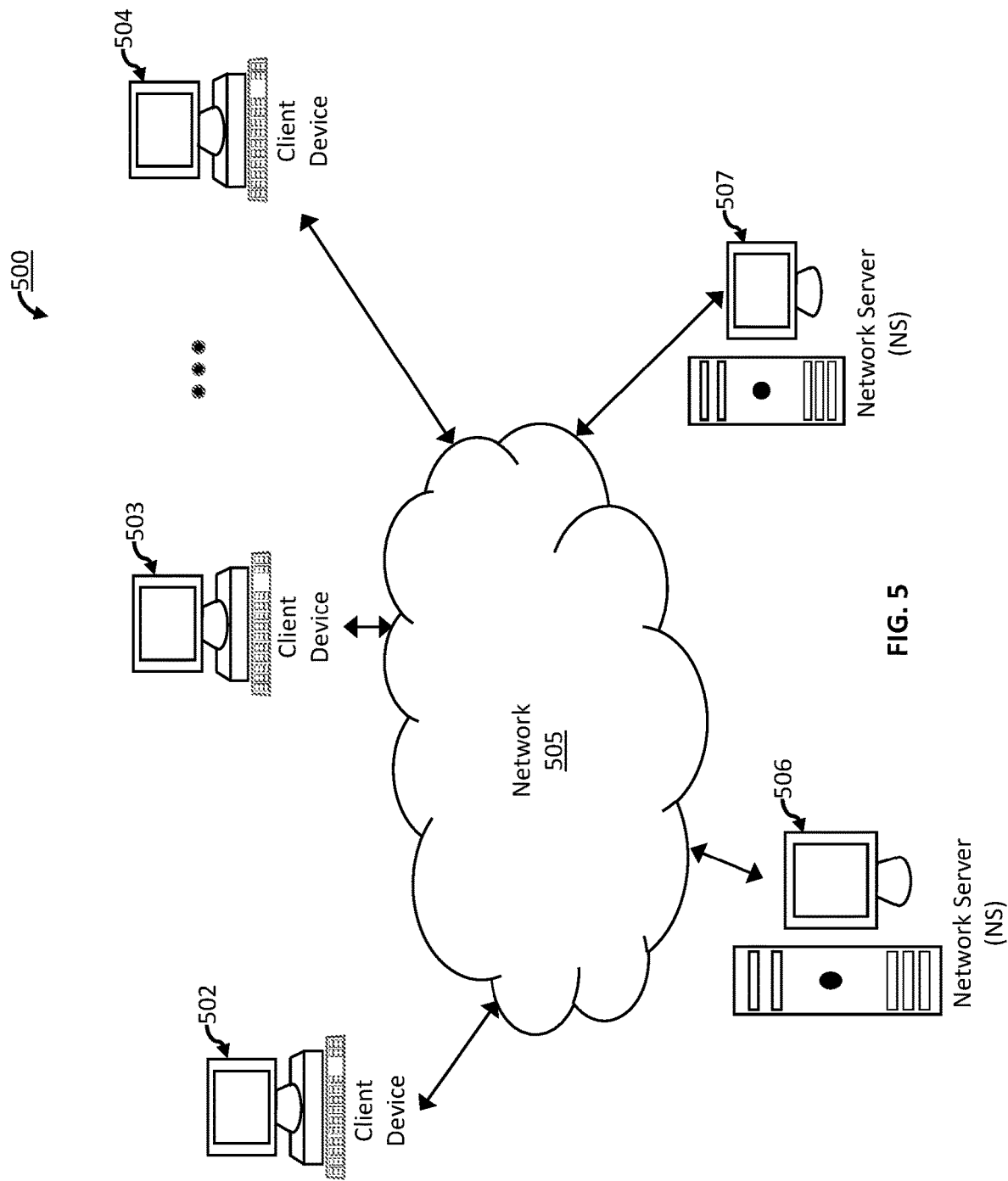
FIG. 5 depicts a block diagram of an exemplary computer-based system 500 for solar roof design in accordance with one or more embodiments of the present disclosure.

FIG. 5 depicts a block diagram of an exemplary computer-based system and platform 500 in accordance with one or more embodiments of the present disclosure. However, not all of these accessories may be required to practice one or more embodiments, and variations in the arrangement and type of the accessories may be made without departing from the spirit or scope of various embodiments of the present disclosure. In some embodiments, the illustrative computing devices and the illustrative computing accessories of the exemplary computer-based system and platform 500 may be configured to manage a large number of members and concurrent transactions, as detailed herein. In some embodiments, the exemplary computer-based system and platform 500 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 5, member computing device 502, member computing device 503 through member computing device 504 (e.g., clients) of the exemplary computer-based system and platform 500 may include virtually any computing device capable of receiving and sending a message over a network (e.g., cloud network), such as network 505, to and from another computing device, such as servers 506 and 507, each other, and the like. In some embodiments, the member devices 502-504 may be personal computers, multiprocessor systems, microprocessor-based or programmable consumer electronics, network PCs, and the like. In some embodiments, one or more member devices within member devices 502-504 may include computing devices that typically connect using a wireless communications medium such as cell phones, smart phones, pagers, walkie talkies, radio frequency (RF) devices, infrared (IR) devices, GB-s citizens band radio, integrated devices combining one or more of the preceding devices, or virtually any mobile computing device, and the like. In some embodiments, one or more member devices within member devices 502-504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 502-504 may include may run one or more applications, such as Internet browsers, mobile applications, voice calls, video games, videoconferencing, and email, among others. In some embodiments, one or more member devices within member devices 502-504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 502-504 may be specifically programmed by either Java, .Net, QT, C, C++, Python, PHP and/or other suitable programming language. In some embodiment of the device software, device control may be distributed between multiple standalone applications. In some embodiments, software accessories/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 502-504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, Z-Wave, Long Range Wide Area Network (LoRaWAN), open radio access network (ORAN), 3G, 4G, 5G, GSM, GPRS, WiFi, WiMax, CDMA, OFDM, OFDMA, LTE, satellite and any combination thereof. In some embodiments, the exemplary network 505 may also include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Apache on Linux or Microsoft IIS (Internet Information Services). In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 501-504.

In some embodiments and, optionally, in combination of any embodiment described above or below, for example, one or more exemplary computing member devices 502-504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 6:
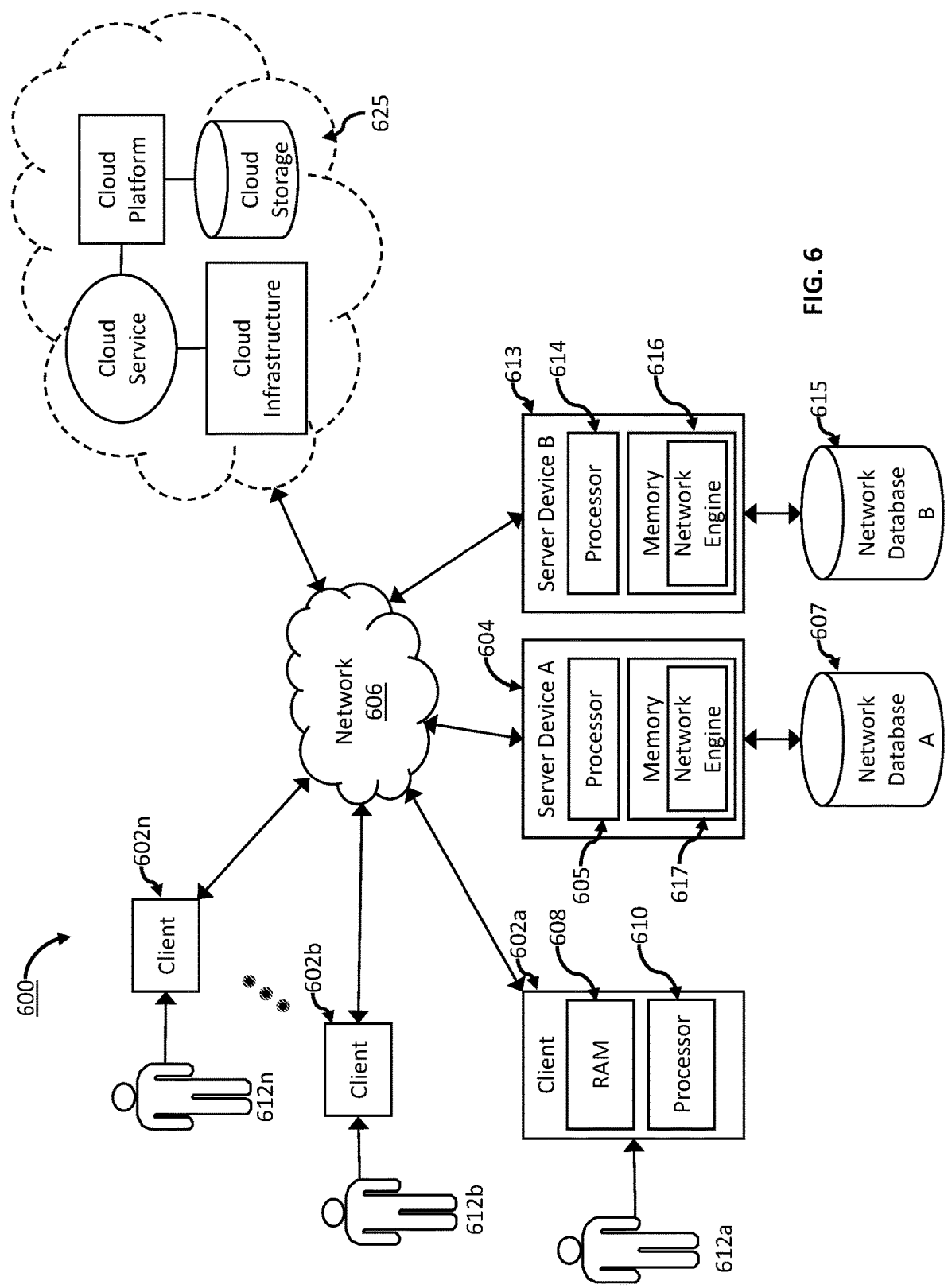
FIG. 6 depicts a block diagram of another exemplary computer-based system and platform 600 for facilitating solar roof design in accordance with one or more embodiments of the present disclosure.

FIG. 6 depicts a block diagram of another exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 602a, member computing device 602b through member computing device 602n shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, virtual machine, software container (e.g., Docker or other suitable container), and/or a state machine among other physical and/or virtual processing technologies or any combination thereof. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of the member computing device 602a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 602a through 602n may also comprise a number of external or internal devices such as a mouse, a CD-ROM, DVD, a physical or virtual keyboard, a display, or other input or output devices. In some embodiments, examples of member computing devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing devices 602a through 602n may be specifically programmed with one or more application programs in accordance with one or more principles/methodologies detailed herein. In some embodiments, member computing devices 602a through 602n may operate on any operating system capable of supporting a browser or browser-enabled application, such as Microsoft™ Windows™, and/or Linux. In some embodiments, member computing devices 602a through 602n shown may include, for example, personal computers executing a browser application program such as Microsoft Corporation's Internet Explorer™, Google Chrome, Apple Computer, Inc.'s Safari™, Mozilla Firefox, and/or Opera. In some embodiments, through the member computing client devices 602a through 602n, user 612a, user 612b through user 612n, may communicate over the exemplary network 606 with each other and/or with other systems and/or devices coupled to the network 606. As shown in FIG. 6, exemplary server devices 604 and 613 may include processor 605 and processor 614, respectively, as well as memory 617 and memory 616, respectively. In some embodiments, the server devices 604 and 613 may be also coupled to the network 606. In some embodiments, one or more member computing devices 602a through 602n may be mobile clients.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
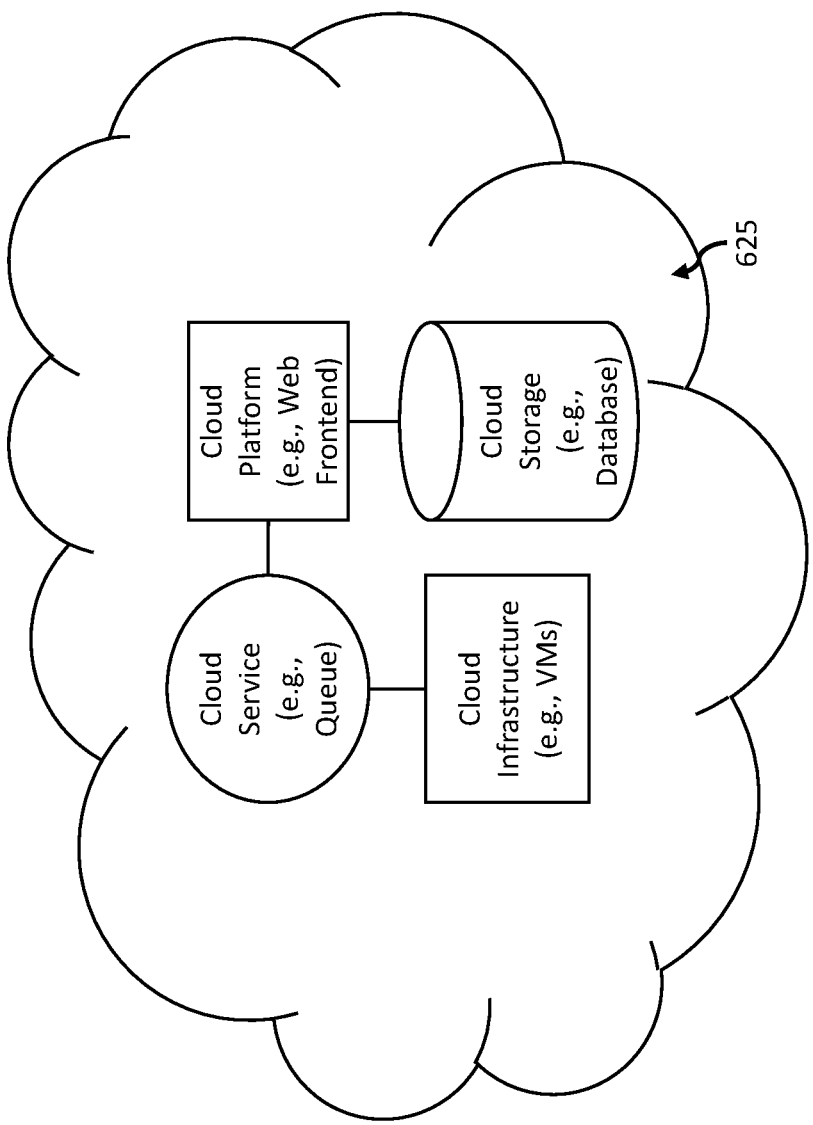
FIG. 7 illustrates schematics of exemplary implementations of a cloud computing/architecture(s) which may be utilized to facilitate solar roof design in accordance with one or more embodiments of the present disclosure.
Figure 8:
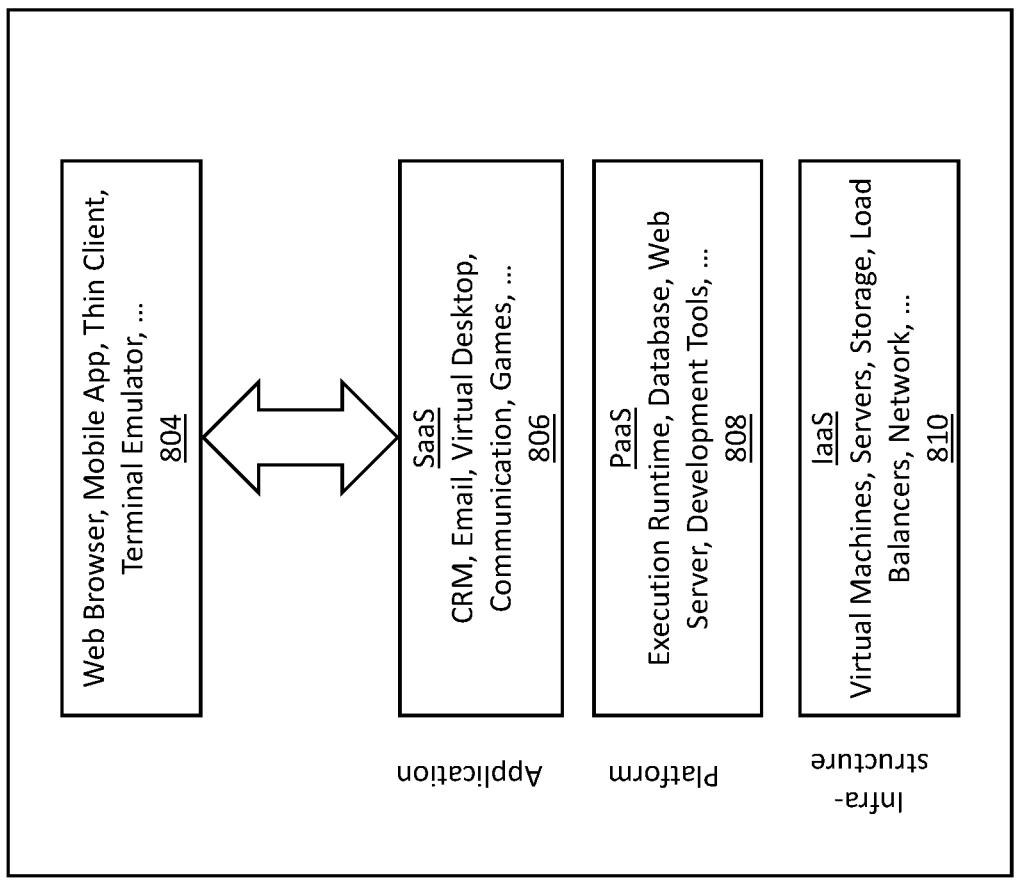
FIG. 8 illustrates schematics of exemplary implementations of the cloud computing/architecture(s) in which solar roof designs may be specifically configured to be generated in accordance with one or more embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 625 such as, but not limiting to: infrastructure a service (IaaS) 810, platform as a service (PaaS) 808, and/or software as a service (SaaS) 806 using a web browser, mobile app, thin client, terminal emulator or other endpoint 804. FIG. 7 and FIG. 8 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

Figure 9:
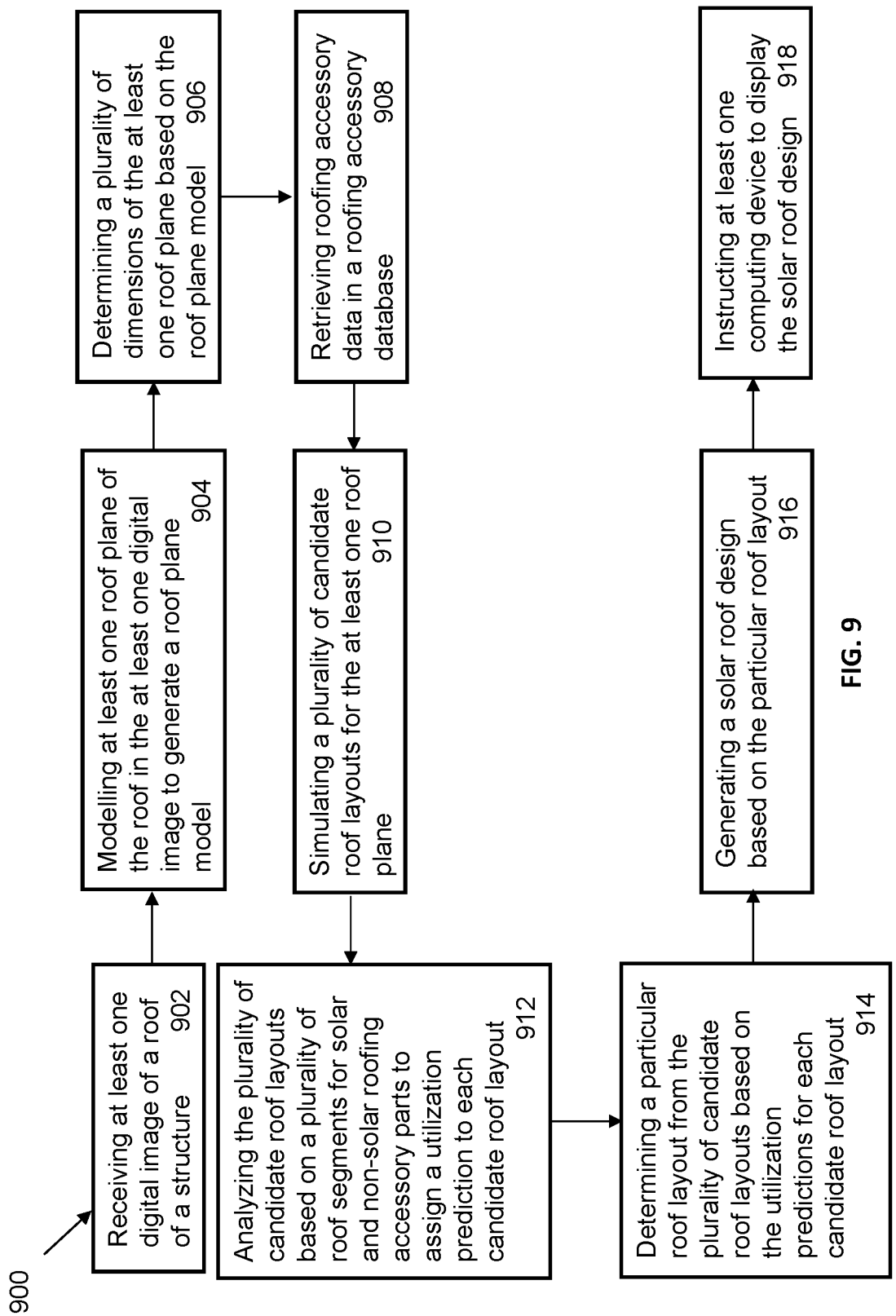
FIG. 9 illustrates a method for facilitating generation of a solar roof design according to one or more embodiments of the present disclosure.

Referring now also to FIG. 9, an exemplary method 900 for facilitating generation of a solar roof design according to embodiments of the present disclosure is shown. Any of the systems, devices, componentry, models, software, hardware, or any combination thereof, may be utilized to perform the steps of the method 900. In certain embodiments, the method 900 may include, at 902, receiving at least one digital image of a roof of a structure. In certain embodiments, at 902, the method 900 may include receiving any type of content taken of the roof of a structure. For example, the content may include, but is not limited to, video content, audio content, virtual reality content, augmented reality content, any type of content, or any combination thereof. In certain embodiments, the roof may include, but is not limited to including, shingles, tiles, wireways, photovoltaic modules and/or systems, trusses, joists, the roof deck, insulation layers, roofing accessories, or any combination thereof. In certain embodiments, the structure may include any type of building, house, vessel, any type of structure, or any combination thereof. At 904, the method 900 may include modelling at least one roof plane of the roof in the at least one digital image to generate a roof plane model. At 906, the method 900 may include determining a plurality of dimensions of the at least one roof plane based on the roof plane model.

At 908, the method 900 may include retrieving roofing accessory data in a roofing accessory database. In certain embodiments, the roofing accessory data may include, but is not limited to, a plurality of solar roofing accessory part identifiers. In certain embodiments, each solar roofing accessory part identifier may identify each solar roofing accessory part of a plurality of solar roofing accessory parts. In certain embodiments, the roofing accessory data may also include, but is not limited to, a plurality of solar roofing accessory part performance characteristics. In certain embodiments, each solar roofing accessory part performance characteristic may be associated with each solar roofing accessory part of the plurality of solar roofing accessory parts. At step 910, the method 900 may include simulating a plurality of candidate roof layouts for the at least one roof plane. In certain embodiments, the simulating may be based on the plurality of dimensions of the at least one roof plane and the plurality of solar roofing accessory parts, wherein each candidate roof layout of the plurality candidate roof layouts comprises a plurality of roof segments. In certain embodiments, the plurality of roof segments may include a plurality of first type roof segments having a plurality of solar roofing accessory parts and a plurality of second type roof segments having a plurality of non-solar roofing accessory parts.

At step 912, the method 900 may include analyzing the plurality of candidate roof layouts based on the plurality of first type roof segments having the plurality of solar roofing accessory parts and the plurality of second type roof segments having the plurality of non-solar roofing accessory parts to assign a particular utilization prediction to each candidate roof layout of the plurality of candidate roof layouts to generate a plurality of utilization predictions. In certain embodiments, the particular utilization prediction of each candidate roof layout may be based on at least one installation metric for installing each candidate roof layout and at least one solar roofing accessory part performance characteristic associated with each solar roofing accessory part. At step 914, the method 900 may include determining a particular roof layout from the plurality of candidate roof layouts based at least in part on the plurality of utilization predictions associated with the plurality of candidate roof layouts. In certain embodiments, the roof layout may include a plurality of selected solar roofing accessory parts associated with the plurality of solar roofing parts of the particular roof layout and a plurality of selected non-solar roofing accessory parts of the plurality of non-solar roofing accessory parts.

At step 916, the method 900 may include generating a solar roof design based at least in part on the particular roof layout. In certain embodiments, the solar roof design may include, but is not limited to, a list of solar roofing accessory part identifiers, identifying each selected solar roofing accessory part of the plurality of selected solar roofing accessory parts of the particular roof layout so as to track each selected solar roofing accessory part during a lifetime of a roof completed based at least in part on the solar roof design. At step 918, the method 900 may include instructing at least one computing device to display the solar roof design. Notably, the method 900 may is not limited to the specific sequence of steps shown in FIG. 9 and may include any of the features and functionality described in the present disclosure.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software accessory and/or a combination of at least one software accessory and at least one hardware accessory which are designed/programmed/ configured to manage/control other software and/or hardware accessories (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software accessories, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeB SD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software accessory such as, without limitation, a stand-alone software package, a combination of software packages, or it may be a software package incorporated as a "tool" in a larger software product.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

As used herein, the term "mobile device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using LoRaWAN, or GPS accessed using any reasonable form of wireless and non-wireless communication; WiFi™ server location data; LoRaWAN based location data; Ultra-Wide Band (UWB) based location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

The aforementioned examples are, of course, illustrative and not restrictive.

At least some aspects of the present disclosure will now be described with reference to the following numbered clauses.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
    simulating, by at least one processor, a plurality of candidate roof layouts for at least one roof plane of a roof, based at least in part on:
        a plurality of dimensions of the at least one roof plane and
        wherein each candidate roof layout of the plurality candidate roof layouts comprises a plurality of candidate roof segments;
        wherein the plurality of candidate roof segments comprises:
            at least one candidate solar roof segment having at least one candidate solar roofing accessory part comprising at least one photovoltaic cell; and
            at least one candidate non-solar roof segment having at least one non-solar candidate roofing accessory part;
    generating, by at least one processor, a plurality of utilization predictions for the plurality of candidate roof layouts to assign a particular utilization prediction to each candidate roof layout based at least in part on:
        at least one installation metric for installing each candidate roof layout,
        at least one candidate solar roofing accessory part performance characteristic associated with the at least one candidate solar roofing accessory part of the at least one candidate solar roof segment, and
        at least one candidate non-solar roofing accessory part performance characteristic associated with the at least one candidate non-solar roofing accessory part of the at least one candidate non-solar roof segment;
    determining, by at least one processor, a particular roof layout from the plurality of candidate roof layouts based at least in part on the plurality of utilization predictions associated with the plurality of candidate roof layouts;
        wherein the particular roof layout comprises:
            at least one particular solar roofing accessory part associated with the at least one candidate solar roofing accessory part of the particular roof layout; and
            at least one particular non-solar roofing accessory part associated with the at least one candidate non-solar roofing accessory part of the particular roof layout;
    generating, by at least one processor, a final solar roof design for the roof based at least in part on the particular roof layout;
        wherein the final roof solar design comprises a list of roofing accessory part identifiers identifying:
            the at least one particular solar roofing accessory part, and
            the at least one particular non-solar roofing accessory part; and
    instructing, by at least one processor, to provide the at least one particular solar roofing accessory part and the at least one particular non-solar roofing accessory part to the roof based on the final solar roof design.

2. The method as recited in claim 1, further comprising: instructing, by the at least one processor, at least one computing device to display the final roof design.

3. The method as recited in claim 1, further comprising: determining, by the at least one processor, full-device placements in the at least one solar roof segment based at least in part on the at least one solar roofing accessory part and the dimensions of the at least one roof plane;
    wherein the full-device placements represent a first arrangement of the at least one solar roofing accessory part that fit within in the at least one solar roof segment;
determining, by the at least one processor, partial-device placements in the at least one non-solar roof segment based at least in part on the at least one solar roofing accessory part and the dimensions of the at least one roof plane; and wherein the partial-device placements represent positions on the at least one roof plane that fit a portion of the at least one solar roofing accessory part.

4. The method as recited in claim 1, further comprising:
generating, by the at least one processor, estimates of a labor cost and an accessory cost associated with installing the at least one particular solar roofing accessory part according to the solar roof design.

5. The method as recited in claim 1, further comprising:
determining, by the at least one processor, an installation time needed to install the at least one particular solar roofing accessory part according to the solar roof design.

6. The method as recited in claim 1, further comprising:
generating, by the at least one processor, a bill-of-materials representing the at least one non-solar roofing accessory part of the solar roof design.

7. The method as recited in claim 1, wherein the at least one solar roofing accessory part performance characteristic associated with the at least one solar roofing accessory part comprises a part-specific solar efficiency metric.

8. The method as recited in claim 1, further comprising:
determining, by the at least one processor, a geographic location associated with the structure;
determining, by the at least one processor, a geographic orientation of the at least one roof plane based at least in part on the geographic location and at least one digital image; and
scoring, by the at least one processor, the plurality of candidate roof layouts based at least in part on the geographic orientation and the at least one particular solar roofing accessory part.

9. The method as recited in claim 1, further comprising:
determining, by the at least one processor, at least one obstruction over the at least one roof plane based at least in part on at least one digital image; and
analyzing, by the at least one processor, the plurality of candidate roof layouts based at least in part on the at least one obstruction and the at least one particular solar roofing accessory part.

10. The method as recited in claim 1, further comprising:
receiving, by the at least one processor, an updated solar roofing accessory part performance characteristic associated with a particular solar roofing accessory part of the at least one solar roofing accessory part;
wherein the updated solar roofing accessory part performance characteristic associated with a particular solar roofing accessory part comprises at least one user input indicating a change to the solar roofing accessory part performance characteristic associated with the particular solar roofing accessory part; and
updating, by the at least one processor, a record associated with the particular solar roofing accessory part to indicate the updated solar roofing accessory part performance characteristic; and
wherein the record is stored in a roofing accessory database.

11. A system for providing a roof solar design to a roof structure, the system comprising:
at least one processor configured to execute software instructions, wherein the software instructions, when executed, cause that least one processor to perform steps to:

simulate a plurality of candidate roof layouts for at least one roof plane of a roof on a structure, based at least in part on:
a plurality of dimensions of the at least one roof plane and
wherein each candidate roof layout of the plurality candidate roof layouts comprises a plurality of candidate roof segments;
wherein the plurality of candidate roof segments comprises:
at least one candidate solar roof segment having a at least one candidate solar roofing accessory part comprising at least one photovoltaic cell; and
at least one candidate non-solar roof segment having at least one non-solar candidate roofing accessory part;
generate a plurality of utilization predictions for the plurality of candidate roof layouts to assign a particular utilization prediction to each candidate roof layout based at least in part on:
at least one installation metric for installing each candidate roof layout,
at least one candidate solar roofing accessory part performance characteristic associated with the at least one candidate solar roofing accessory part of the at least one candidate solar roof segment, and
at least one candidate non-solar roofing accessory part performance characteristic associated with the at least one candidate non-solar roofing accessory part of the at least one candidate non-solar roof segment;
determine a particular roof layout from the plurality of candidate roof layouts based at least in part on the plurality of utilization predictions associated with the plurality of candidate roof layouts;
wherein the particular roof layout comprises:
at least one particular solar roofing accessory part associated with the at least one candidate solar roofing accessory part of the particular roof layout; and
at least one particular non-solar roofing accessory part associated with the at least one candidate non-solar roofing accessory part of the particular roof layout;
generate a final solar roof design for the roof based at least in part on the particular roof layout;
wherein the final roof solar design comprises a list of roofing accessory part identifiers identifying:
the at least one particular solar roofing accessory part, and
the at least one particular non-solar roofing accessory part; and
instruct to provide the at least one particular solar roofing accessory part and the at least one particular non-solar roofing accessory part to the roof based on the final solar roof design.

12. The system as recited in claim 11, wherein the software instructions, when executed, further cause that least one processor to perform steps to:
instruct at least one computing device to display the final roof design.

13. The system as recited in claim 11, wherein the software instructions, when executed, further cause that least one processor to perform steps to:
  determine full-device placements in the at least one solar roof segment based at least in part on the at least one solar roofing accessory part and the dimensions of the at least one roof plane;
    wherein the full-device placements represent a first arrangement of the at least one solar roofing accessory part that fit within in the at least one solar roof segment;
  determine partial-device placements in the at least one non-solar roof segment based at least in part on the at least one solar roofing accessory part and the dimensions of the at least one roof plane; and
    wherein the partial-device placements represent positions on the at least one roof plane that fit a portion of the at least one solar roofing accessory part.

14. The system as recited in claim 11, wherein the software instructions, when executed, further cause that least one processor to perform steps to:
  generate estimates of a labor cost and an accessory cost associated with installing the at least one particular solar roofing accessory part according to the solar roof design.

15. The system as recited in claim 11, wherein the software instructions, when executed, further cause that least one processor to perform steps to:
  determine an installation time needed to install the at least one particular solar roofing accessory part according to the solar roof design.

16. The system as recited in claim 11, wherein the software instructions, when executed, further cause that least one processor to perform steps to:
  generate a bill-of-materials representing the at least one non-solar roofing accessory part of the solar roof design.

17. The system as recited in claim 11, wherein the at least one solar roofing accessory part performance characteristic associated with the at least one solar roofing accessory part comprises a part-specific solar efficiency metric.

18. The system as recited in claim 11, wherein the software instructions, when executed, further cause that least one processor to perform steps to:
  determine a geographic location associated with the structure;
  determine a geographic orientation of the at least one roof plane based at least in part on the geographic location and at least one digital image; and
  score plurality of candidate roof layouts based at least in part on the geographic orientation and the at least one particular solar roofing accessory part.

19. The system as recited in claim 11, wherein the software instructions, when executed, further cause that least one processor to perform steps to:
  determine at least one obstruction over the at least one roof plane based at least in part on at least one digital image; and
  analyze the plurality of candidate roof layouts based at least in part on the at least one obstruction and the at least one particular solar roofing accessory part.

20. The system as recited in claim 11, wherein the software instructions, when executed, further cause that least one processor to perform steps to:
  receive an updated solar roofing accessory part performance characteristic associated with a particular solar roofing accessory part of the at least one solar roofing accessory part;
    wherein the updated solar roofing accessory part performance characteristic associated with a particular solar roofing accessory part comprises at least one user input indicating a change to the solar roofing accessory part performance characteristic associated with the particular solar roofing accessory part; and
  update a record associated with the particular solar roofing accessory part to indicate the updated solar roofing accessory part performance characteristic; and
    wherein the record is stored in a roofing accessory database.

* * * * *